US006969842B2

(12) United States Patent
Graves

(10) Patent No.: US 6,969,842 B2
(45) Date of Patent: *Nov. 29, 2005

(54) DISPERSION DISCRIMINATION FOR WIDEBAND OPTICAL SIGNALS

(75) Inventor: Alan F. Graves, Kanata (CA)

(73) Assignee: Nortel Networks Limited, St. Laurent (CA)

(*) Notice: Subject to any disclaimer, the term of this patent is extended or adjusted under 35 U.S.C. 154(b) by 663 days.

This patent is subject to a terminal disclaimer.

(21) Appl. No.: 10/108,514

(22) Filed: Mar. 29, 2002

(65) Prior Publication Data

US 2004/0208606 A1 Oct. 21, 2004

(51) Int. Cl.$^7$ ............................................. G01N 21/25
(52) U.S. Cl. .............................. 250/227.23; 250/227.18
(58) Field of Search ...................... 250/227.23, 227.18, 250/226, 216; 356/351, 456, 460; 398/81, 398/93, 45, 29

(56) References Cited

U.S. PATENT DOCUMENTS

| 6,043,914 A | 3/2000 | Cook et al. |
| RE38,289 E * | 10/2003 | Bergano ...................... 385/122 |
| 2002/0018265 A1 | 2/2002 | Graves |

OTHER PUBLICATIONS

Reining in Chromatic Dispersion; article by Mark Barratt in Telecom Flash magazine (online), posted in Nov. 2001, downloaded from http://www.telecoms-mag.com/default.asp?journalid=3&func=articles&page=0111t12&year=2001 &month=11 on Jan. 11, 2002.

European Search Report of Application No. EP 03251767 mailed Feb. 10, 2005.

* cited by examiner

Primary Examiner—Que T. Le
(74) Attorney, Agent, or Firm—Withrow & Terranova, PLLC

(57) ABSTRACT

A system for detecting dispersion in an incoming optical signal centered about a channel center frequency. The system includes a splitter unit for separating the incoming signal into first and second groups of signals. The system further includes a first compensation region adapted to apply a desired positive dispersion characteristic to a signal in the first group and a second compensation region adapted to apply a desired negative dispersion characteristics to a signal in the second group. The splitter also includes a receiver unit connected to the first and second compensation regions, and adapted to compare the received signals and to detect the dispersion in the incoming optical signal on the basis of the comparison. The system can be selectively balanced at different optical frequencies by varying the amount of dispersion applied by the first and second compensation regions. It is thus possible to balance the system at a given channel center frequency such measurement of a minimal resultant dispersion in the receiver unit is indicative of the incoming optical signal being dispersion-free at that frequency.

43 Claims, 12 Drawing Sheets

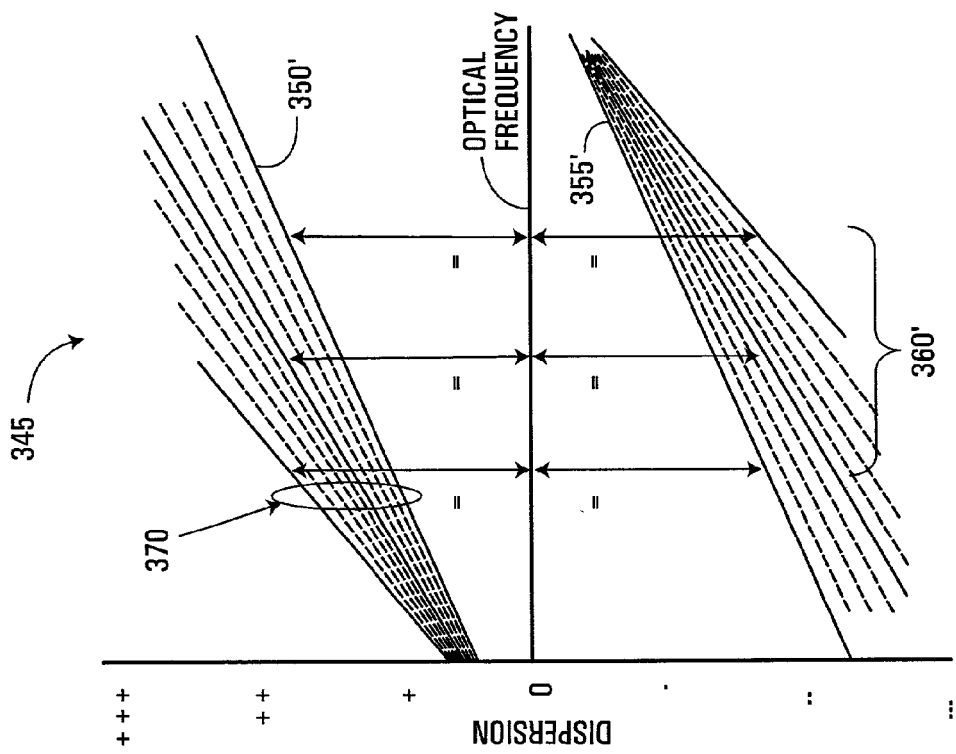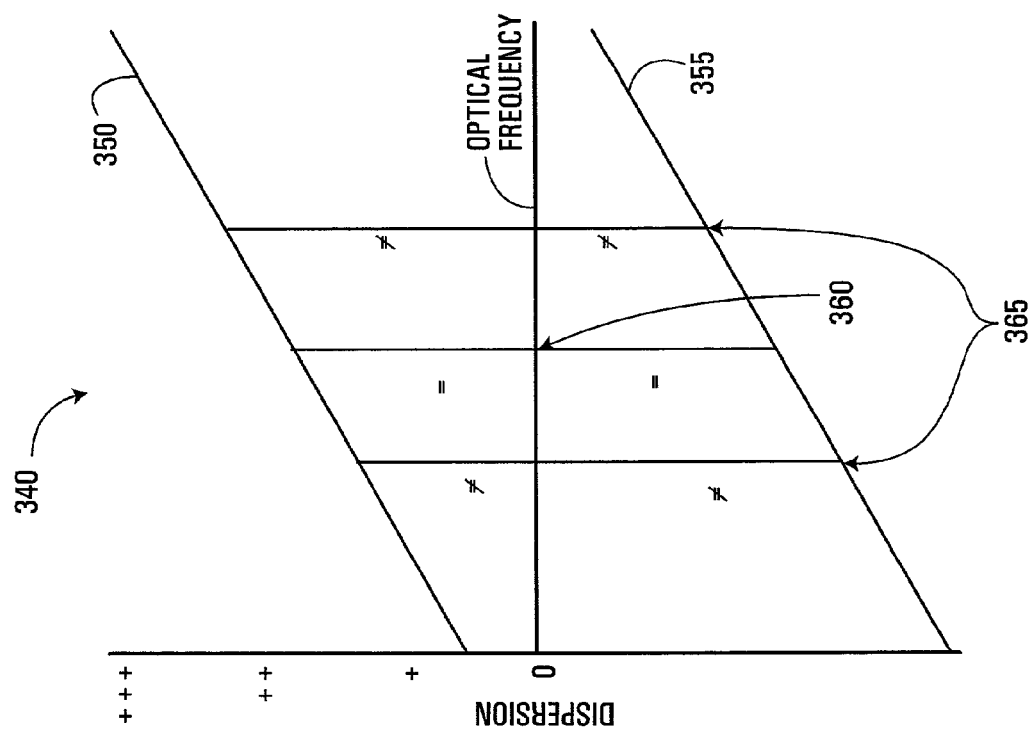
FIG. 3B

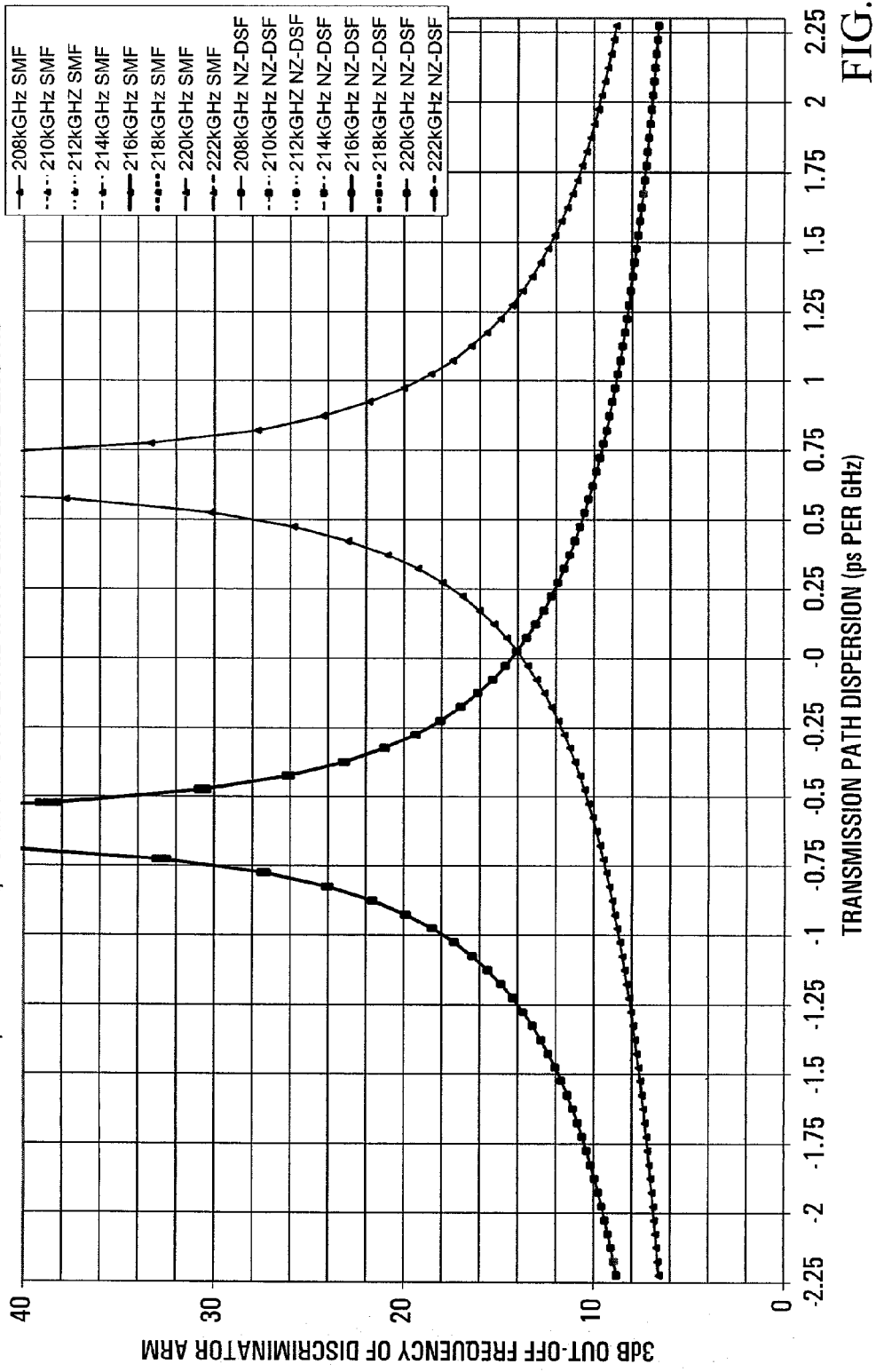

| FREQUENCY | LENGTH (LNOM=5KM) SMF (AGGREGATE +VE) | NZ-DSF (AGGREGATE -VE) |
|---|---|---|
| 212400 | 4.382 | 5.789 |
| 212500 | 4.416 | 5.732 |
| 212600 | 4.450 | 5.675 |
| 212700 | 4.484 | 5.620 |
| 212800 | 4.519 | 5.566 |
| 212900 | 4.555 | 5.513 |
| 213000 | 4.591 | 5.461 |
| 213100 | 4.627 | 5.410 |
| 213200 | 4.665 | 5.360 |
| 213300 | 4.702 | 5.311 |
| 213400 | 4.741 | 5.263 |
| 213500 | 4.780 | 5.215 |
| 213600 | 4.820 | 5.169 |
| 213700 | 4.860 | 5.123 |
| 213800 | 4.902 | 5.078 |
| 213900 | 4.943 | 5.034 |
| 214000 | 4.986 | 4.991 |
| 214100 | 5.029 | 4.948 |
| 214200 | 5.073 | 4.906 |
| 214300 | 5.118 | 4.865 |
| 214400 | 5.164 | 4.824 |
| 214500 | 5.210 | 4.784 |
| 214600 | 5.258 | 4.745 |
| 214700 | 5.306 | 4.707 |
| 214800 | 5.355 | 4.669 |
| 214900 | 5.405 | 4.631 |
| 215000 | 5.456 | 4.595 |
| 215100 | 5.508 | 4.558 |
| 215200 | 5.560 | 4.523 |
| 215300 | 5.614 | 4.488 |
| 215400 | 5.669 | 4.453 |
| 215500 | 5.725 | 4.419 |

DISPERSION DISCRIMINATION FOR WIDEBAND OPTICAL SIGNALS

CROSS-REFERENCES TO RELATED APPLICATIONS

The present invention is related in subject matter to U.S. patent application Ser. No. 09/965,810 to Graves, entitled "Dispersion Discrimination And Compensation System And Optical Switch For Use Therewith", filed on Oct. 2, 2001, hereby incorporated by reference herein.

The present invention is also related in subject matter to U.S. patent application Ser. No. 09/842,236 to Graves, entitled "Chromatic Dispersion Discriminator", filed on Apr. 26, 2001, hereby incorporated by reference herein.

FIELD OF THE INVENTION

The present invention relates generally to techniques for detecting or discriminating the dispersion which affects an optical signal and, in particular, to dispersion discrimination techniques that are accurate over a wide range of optical frequencies.

BACKGROUND OF THE INVENTION

Optical waveguides provide a maximum velocity of propagation for light occupying a relatively narrow range of wavelengths or optical frequencies. The point at which this maximum velocity is achieved depends on the design and material composition of the waveguide. For wavelengths outside this range, the velocity of propagation falls slightly as the wavelength moves further away from the wavelength of maximum velocity. This lower velocity manifests itself as a variable delay through a long optical waveguide path, where the delay depends on the light frequency or wavelength.

The derivative of the propagation delay with respect to the wavelength or frequency of light propagated through an optical waveguide is referred to as chromatic dispersion. An optical signal is said to have positive chromatic dispersion polarity if the higher-frequency components are delayed with respect to lower-frequency components, while negative chromatic dispersion polarity refers to the opposite situation. It is to be noted that other types of dispersion exist, such as polarization mode dispersion for which the two polarizations (horizontal and vertical) of light are propagated at two different velocities in an optical waveguide. In the following, the term "dispersion" encompasses either or both types of dispersion.

In an optical telecommunications system, dispersion may be problematic. In particular, an optical carrier that is modulated with data contains information-related sideband optical frequencies differing slightly from the carrier's optical frequency. Specifically, two sidebands (an upper one and a lower one) are present on either side of each carrier optical frequency since the data typically amplitude modulates the optical carrier. If the carrier frequency is not within the range of frequencies conducive to maximal propagation velocity, the delay experienced by the upper sideband will differ from the delay experienced by the lower sideband. Therefore, the upper and lower sidebands will be phase shifted by an amount determined by the differential delay between the upper and lower sidebands, which increases with sideband optical frequency. At some sideband frequencies, this phase shift can interfere destructively so as to reduce the amplitude of these sideband optical frequencies at the receiving end. As the delay between optical frequency components in the two sidebands approaches 180°, total cancellation will occur. Those skilled in the art will appreciate that this is an undesirable scenario, which may lead to information loss if left uncorrected.

Clearly, therefore, it would be advantageous to correct dispersion in an optical transmission system by ensuring that the system, taken as a whole, operates over an optical path with a negligible propagation velocity differential at optical frequencies around the carrier optical frequency of the signal being propagated. This would allow the upper and lower sidebands to experience the same propagation delay, thereby avoiding the destructive interference described above.

An example of a conventional dispersion compensation system is a length of "compensating fiber" which is inserted into a transmission path. The length and properties of the compensating fiber are chosen so that the latter will have a desired compensatory effect on a dispersion-affected signal propagated therethrough. However, the optical frequency range (or "window") for which the dispersion remains within a given tolerance is relatively narrow. This is because the optical frequency of maximum propagation velocity through the compensating fiber is different from the optical frequency of maximum propagation velocity through the fiber being compensated and hence the rate of change of dispersion with optical frequency of the compensating fiber does not cancel the rate of change of dispersion with optical frequency of the fiber being compensated, except within a very narrow range of frequencies. Although the dispersion of the compensating fiber may be equal but opposite at a given optical frequency to the dispersion present in a dispersion-affected signal propagated, the slope of the dispersion (d(dispersion)/d(optical frequency)) is of the same polarity for all dispersive structures with a propagation velocity that passes through a maximum rate of change at a particular optical frequency.

In order to correct the dispersion at multiple frequencies, it has been proposed to use a concatenated mixture of fiber types, each targetting a specific window of optical frequencies. However, in order for this solution to work as intended, the degree of dispersion affecting each window of optical frequencies must be known ahead of time. In a photonically switched network, this requirement is impossible to satisfy, since, at different times, adjacent wavelengths in a WDM stream may have different ancestries and suffer from different impairments. Therefore, a conventional approach cannot be used to correct dispersion in photonically switched networks, unless rigorous compensation is carried out on every span between switches, and even then the residual errors in compensation will build up span-by-span as the signals propagate through the network.

With the aim of providing adequate dispersion compensation for a photonically switched multi-channel optical signal, above-referenced U.S. patent application Ser. No. 09/965,810 describes a dispersion discrimination and compensation system including a dispersion discrimination subsystem shown in FIG. 1. Suitable implementations of a dispersion discrimination subsystem 12 are described in above-referenced U.S. patent application Ser. No. 09/842,236. For example, a dispersion discrimination subsystem 12 may include two arms 20, 22, one of which adds positive dispersion and the other of which adds negative dispersion. Each arm is fed a portion of the live traffic or other optical signal from the dispersive transmission path under test that is tapped by a splitter 18 connected to an optical fiber 14. The signals in each of the two arms 20, 22 enter a processing unit 24, where they are processed and compared to one another, resulting in the issuance of control signals 25 which are used to control, in this specific case, the amount of dispersion applied by a dispersion compensation subsystem (not shown in FIG. 1).

The design of the arms 20, 22 in the dispersion discrimination subsystem 12 is such that each arm introduces dispersion of an equal magnitude but of an opposite polarity for the one case where the signal drawn from the optical fiber 14 is devoid of dispersion. This will result in a balanced roll-off of spectral energy at high modulation frequencies in the detectors in both arms 20, 22, when fed from a dispersionless source or test signal. In the case where the signal drawn from the optical fiber 14 suffers from dispersion, the discriminator arm with like dispersion polarity will exhibit a lower roll-off frequency since its dispersion will add to the dispersion of the signal exiting the optical fiber 14, while the other arm will show a less severe roll-off due to some usually incomplete level of dispersion compensation. This can be detected as a differential spectral energy density when a scanning filter is scanned in receivers, comprised in the processing unit 24, attached to the two arms 20, 22, and the results compared.

Thus, it is seen that the processing unit 24 can determine the polarity of the dispersion of the signal (prior to entering the arms 20, 22) by noting which arm has the lower roll-off frequency or sideband spectral density. In addition, U.S. patent application Ser. No. 09/842,236 describes how the processing unit 24 can compute not only the polarity, but also the magnitude of the dispersion present in the signal drawn from the optical fiber 14 by determining the sideband optical frequency at which the first unbalance beyond a set threshold occurs.

From the above, it is apparent that detection of an identical roll-off in both arms 20, 22 is indicative of the two arms having had an equal but opposite effect, from which it is inferred that the signal drawn from the optical fiber 14 must have been afflicted with no discernible amount of dispersion. It is this condition that is sought by the feedback loop involving the dispersion discrimination subsystem 12 and the dispersion compensation system.

The above described system functions adequately when the signal to be discriminated (the "channel under test") has a narrow range of possible optical frequencies. However, when the channel under test has a broad range of possible optical frequencies, the conclusion that an equal reading from both arms 20, 22 implies a dispersion-free signal is not always true. Specifically, this conclusion is only valid when the channel under test is centered about a nominal operating frequency, this nominal operating frequency being dependent on the particular length and construction of the arms 20, 22. Practically speaking, and depending upon the precision required, there may be a range of only a few ITU grid slots (of 50, 100, 200 GHz) of possible center optical frequencies for which an equal reading from both arms 20, 22 of the dispersion discrimination subsystem 12 truly does indicate that the channel under test is free of dispersion. For channels centered about higher or lower optical frequencies outside this range, the dispersion discrimination subsystem 12 will not produce an equal reading when the channel under test has zero dispersion.

The reason for this is that the arms 20, 22 are fabricated from different fibers in order to allow dispersion of a different polarity but same magnitude to be added to the channel under test. Each of the arms 20, 22 of the dispersion discrimination subsystem 12 therefore exhibits a particular optical frequency for maximum propagation velocity; however, the second differential of the delay (or the differential of the dispersion with optical frequency) is positive for both arms 20, 22. Hence, the dispersion discrimination subsystem 12 can only be "balanced" at or close to one optical frequency, with the arms 20, 22 showing differing magnitudes of dispersion at other optical frequencies. Away from the optical frequency at which the dispersion discrimination subsystem 12 is balanced, the processing unit 24 will indicate that it is balanced when in fact the dispersion of the channel under test is equal to the (non-zero) difference between the dispersion applied by the two arms 20, 22 at that frequency.

This operational characteristic of the dispersion discrimination subsystem 12 may be better understood upon consideration of an example. Specifically, FIG. 2A shows a "response characteristic" of the output of each of the two arms 20, 22 as a function of dispersion of the channel under test, when the channel is centered at the nominal operating frequency of the dispersion discrimination subsystem 12 (in this case at around 214 THz, where 1 THz=$10^{12}$ Hz=1000 GHz) and when a particular length and characteristic of dispersion compensating fiber is used in each arm. An example of a suitable "response characteristic" is the −3 dB frequency (low-frequency roll-off) of the received signal spectral density relative to the known transmitted spectral content. The reader is referred to above-referenced U.S. patent application Ser. No. 09/842,236 for other suitable response characteristics.

It will be appreciated that the level of dispersion at which the peak of the response characteristic of a given arm occurs is representative of the opposite of the dispersion applied by that particular arm. Thus, from FIG. 2A showing the results for a discriminator optimized for operation at 214 THz, it is seen that, in this example, the positive dispersion arm 20 applies a dispersion of 0.6 ps/GHz and the negative dispersion arm 22 applies a dispersion of −0.6 ps/GHz. At very close to zero dispersion in the channel under test, the response characteristic of either arm has dropped off considerably, and, moreover, the response characteristics at the output of the two arms 20, 22 have the same value, meaning that the dispersion discrimination subsystem 12 is "balanced". In other words, achieving an identical value for the recovered sideband optical frequency response characteristic in both arms of the dispersion discrimination subsystem 12 results from the two arms 20, 22 applying an equal but opposite overall effect, causing an overlap of their characteristics if the channel under test is free of dispersion upon being drawn from the optical fiber 14.

Another way of understanding FIG. 2A is as follows. As the transmission path dispersion departs from zero, it partially compensates one of the two arms 20, 22 of the dispersion discrimination subsystem 12, while adding dispersion to the other one of the two arms 20, 22, moving the cut off frequency higher for the arm it is partially compensating and reducing the cut-off frequency for the other arm. As the amount of dispersion on the transmission path increases, it eventually reaches a point where it is equal in magnitude but opposite in sign to that of the arm that it was compensating or alternatively that was compensating it and the cut-off frequency increases towards infinity. For dispersion beyond this magnitude, the arm that is of the opposite polarity to the dispersion being measured is now applying compensation to the sample from the transmission path but only partially compensates for the dispersion on the transmission path. In this case, the cut-off frequency falls but always remains above the cut-off frequency of the other arm, which is adding to the transmission path dispersion. By comparing the values of cut-off frequency (in this case −3 dB cut-off) of the two arms 20, 22 and knowing the level of dispersion added in the arms, it is possible to compute the level of dispersion and polarity of dispersion on the transmission path from which the channel under test is drawn.

However, if the channel under test is now centered about a considerably lower or higher frequency than the balance optical frequency for the same lengths and fiber types as above in the two arms 20, 22, the curve of the response characteristic versus the dispersion will be similar in shape to that shown in FIG. 2B. This figure shows different response characteristics over a range of 208 to 222 THz for the channel under test, where the nominal operating frequency of the dispersion discrimination subsystem 12 remains at 214 THz. This series of offset curves shows what happens as a result of the negative arm becoming less negative at the same time as the positive arm becoming more positive as the optical frequency increases, creating a fundamental unbalance in the action of the two arms 20, 22. More specifically, the two arms 20, 22 do not apply compensations that are of opposite polarities and equal magnitude.

More specifically, in the case of a 222 THz optical carrier, for example, it is seen that the positive dispersion arm 20 applies a dispersion of approximately 0.2 ps/GHz, while the negative dispersion arm 22 applies a dispersion of −1.1 ps/GHz. For zero dispersion in the channel under test arriving at the discriminator arms, the response characteristic of either arm has again dropped off considerably. However, the response characteristics of the two arms 20, 22 do not have the same value. This means that the dispersion discrimination subsystem 12 is not balanced for a channel under test centered at about 222 THz; rather, it can be seen that the response characteristics cross over when the channel under test has a dispersion of approximately −0.4 ps/GHz. In other words, the discriminator will indicate a zero dispersion measurement when in fact the channel under test has a dispersion of −0.4 ps/GHz.

Thus, it is seen that the pursuit of an identical response characteristic in both arms 20, 22 will cause a residual dispersion of −0.4 ps/GHz to be retained in the channel under test when the latter is centered at 222 THz. This situation is equally problematic in the case where the channel under test is centered about a considerably lower frequency than the center frequency of the channel for which the dispersion discrimination subsystem 12 is balanced (in this case, 214 THz). It should therefore be appreciated by those of ordinary skill in the art that the above described dispersion discrimination subsystem 12 provides biased results for channels centered about optical frequencies other than those falling within the narrow range where the discriminator is "balanced". This, in turn, causes the application of erroneous levels of compensation by the dispersion compensation subsystem.

Since it is expected that the individual channels of dense wavelength division multiplexed (DWDM) optical signals will occupy increasingly wider ranges of the optical spectrum, it becomes apparent that available techniques for dispersion discrimination are no longer effective unless there can be provided some form of operational dependency on the center frequency of the channel under test.

SUMMARY OF THE INVENTION

There is provided a system for detecting dispersion in an incoming optical signal centered about a channel center frequency. The system includes a splitter unit for separating the incoming signal into first and second groups of signals. The system further includes a first compensation region adapted to apply a desired positive dispersion characteristic to a signal in the first group and a second compensation region adapted to apply a desired negative dispersion characteristic to a signal in the second group. The splitter also includes a receiver unit connected to the first and second compensation regions, and adapted to compare the received signals and to detect the dispersion in the incoming optical signal on the basis of the comparison. The system can be selectively balanced at different optical frequencies by varying the amount of dispersion applied by the first and second compensation regions. It is thus possible to balance the system at a given channel center frequency such that measurement of a minimal resultant dispersion in the receiver unit is indicative of the incoming optical signal being dispersion-free at that frequency.

According a first broad aspect, the invention provides a system for detecting dispersion in an incoming optical signal containing optical frequencies centered about a channel center frequency. The system includes a splitter unit for separating the incoming optical signal into a first group of at least one optical signal and a second group of at least one optical signal. The system further includes a first compensation region connected to the splitter unit, the first compensation region being adapted to apply a desired one of a plurality of positive dispersion characteristics to an optical signal in the first group, as well as a second compensation region connected to the splitter unit, the second compensation region being adapted to apply a desired one of a plurality of negative dispersion characteristics to an optical signal in the second group. The splitter also includes a receiver unit connected to the first and second compensation regions, the receiver unit being adapted to perform a comparison of characteristics of signals received from the first and second compensation regions and to detect the dispersion in the incoming optical signal on the basis of the comparison.

In some embodiments, the first compensation region may include a plurality of first optical paths, where each first optical path applies a distinct positive dispersion characteristic to a corresponding one of the signals in the first group, and the second compensation region may include a plurality of second optical paths, each second optical path applying a distinct positive negative characteristic to a corresponding one of the signals in the second group. Distinct positive and negative dispersion characteristics may be applied by virtue of the first and second optical paths having different lengths or material compositions.

A first optical switch may be provided for selecting a signal in the first group to which the desired positive dispersion characteristic has been applied and preventing any other signals in the first group from reaching the receiver unit. Similarly, a second optical switch may be provided, for selecting a signal in the second group to which the desired negative dispersion characteristic has been applied and preventing any other signals in the second group from reaching the receiver unit.

In some embodiments, a processing unit may be provided, the processing unit being adapted to select the desired positive and negative dispersion characteristics as a function of the channel center frequency. The processing unit may be further adapted to determine the channel center frequency of the incoming optical signal.

According to a second broad aspect, the present invention provides a method of detecting dispersion in an incoming optical signal containing optical frequencies centered about a channel center frequency. The method includes selecting a positive dispersion characteristic and a negative dispersion characteristic on the basis of the channel center frequency of the incoming optical signal; applying the selected positive dispersion characteristic to a first portion of the incoming optical signal; applying the selected negative dispersion characteristic to a second portion of the incoming optical signal; and processing the first and second portions of the optical signal to determine the dispersion in the incoming optical signal.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 3B shows diagrammatically how the dispersion discrimination subsystem of FIG. 3A provides dispersion discrimination, as compared with the capabilities of the dispersion discrimination subsystem of FIG. 1;

FIG. 4 shows a response characteristic of the dispersion discrimination subsystem of FIG. 3A, for various operating optical carrier frequencies across the same range as that of FIG. 2B;

FIG. 10 lists an example of possible fiber lengths for different compositions of fiber, which lead to balanced dispersion discrimination at various channel center frequencies.

DETAILED DESCRIPTION OF THE PREFERRED EMBODIMENTS

Figure 1:
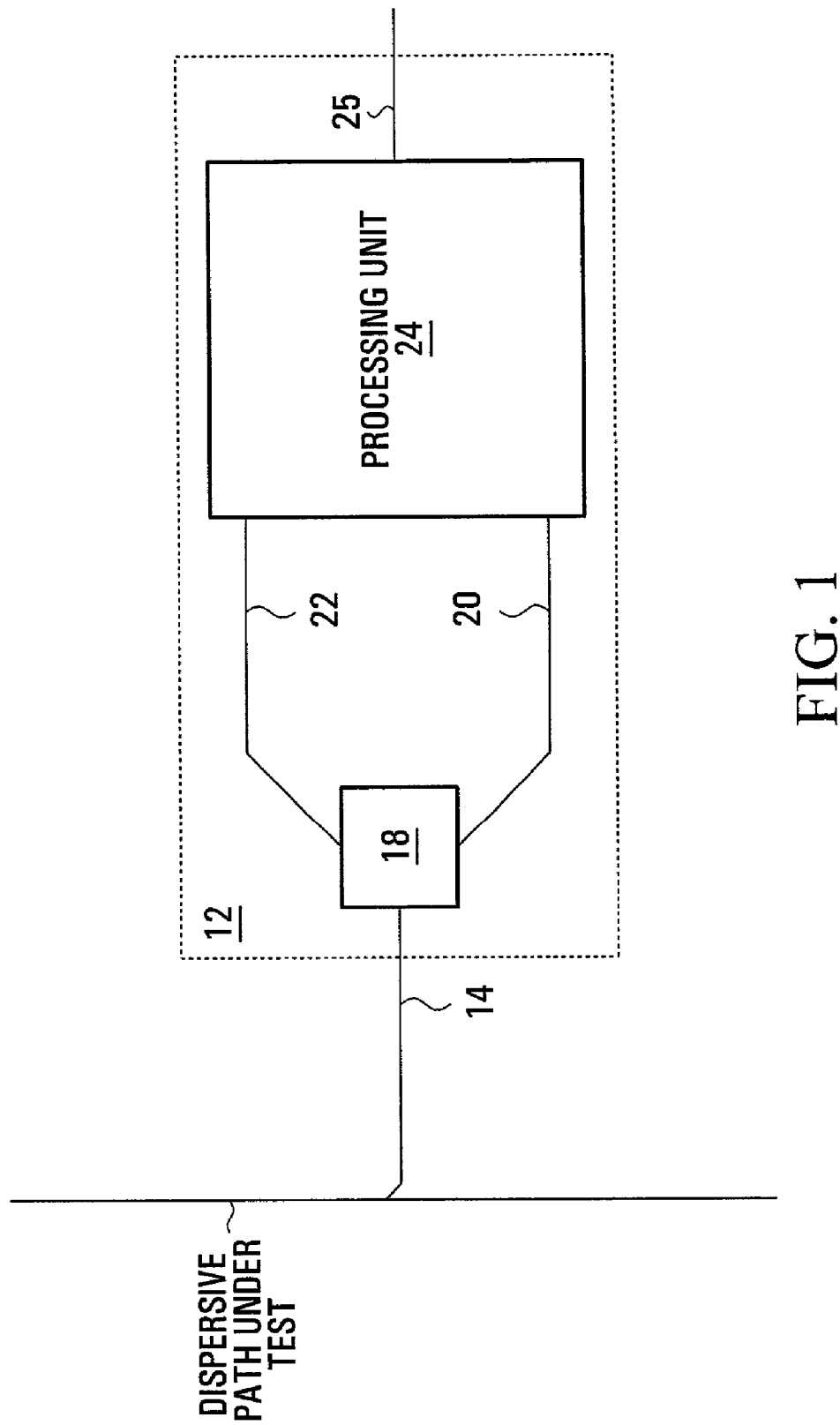
FIG. 1 shows a basic two-arm dispersion discrimination subsystem characterized by a nominal operating carrier frequency.

As has been set forth herein above, a basic two-arm dispersion discrimination subsystem 12 such as the one shown in FIG. 1 is characterized by a nominal operating optical frequency. When the channel under test is centered about the nominal operating optical frequency, an identical response characteristic in both arms 20, 22 of the dispersion discrimination subsystem 12 will be indicative of an absence of dispersion in the signal entering the dispersion discrimination subsystem 12. However, when the channel under test is not centered about the nominal operating optical frequency, the pursuit of an identical response characteristic in both arms 20, 22 will cause residual dispersion to be retained in the signal entering the dispersion discrimination subsystem 12.

Figure 3A:
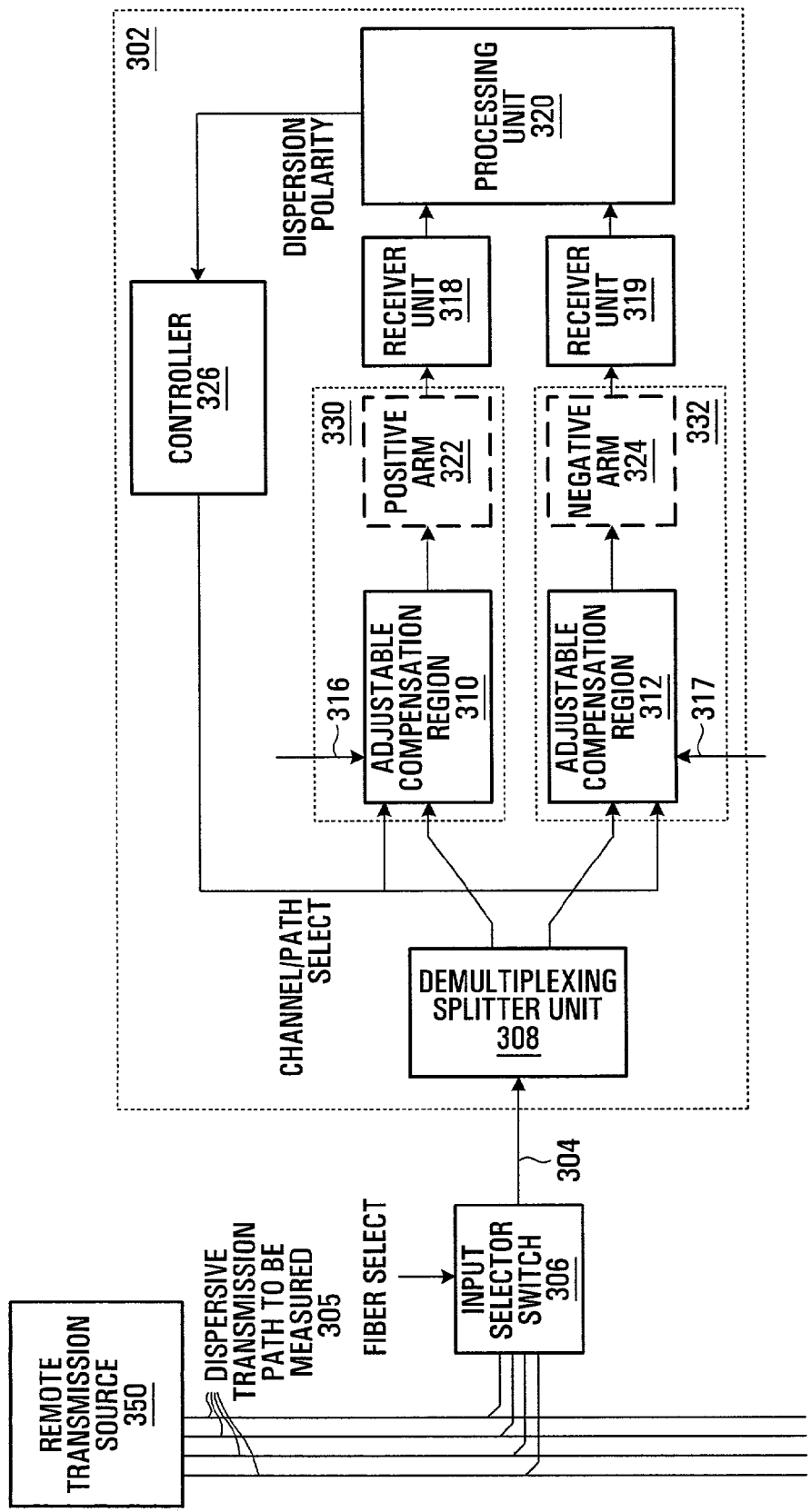
FIG. 3A shows, in block diagram form, a dispersion discrimination subsystem in accordance with a generic embodiment of the present invention.

In contrast, the dispersion discrimination subsystem of the present invention, such as the dispersion discrimination subsystem shown in FIG. 3A, provides an optical signal with the possibility of travelling differently configured paths prior to entry into the two discriminator arms, such that equal but opposite amounts of dispersion can be applied to the signal associated with each arm at each optical frequency of interest. Such a dispersion discrimination subsystem has multiple possible nominal operating optical frequencies, with the nominal operating optical frequency in a given instance being adjustable so as to correspond to the center frequency of the channel under test. As a result, an identical response characteristic in both arms of the dispersion discrimination subsystem will truly be indicative of an absence of dispersion in the signal entering the dispersion discrimination subsystem, for different channels under test having different center frequencies.

Accordingly, with reference to FIG. 3A, there is shown a dispersion discrimination subsystem 302 in accordance with an embodiment of the present invention. The subsystem 302 is useful in determining a polarity and/or magnitude of dispersion affecting the various individual channels of a multi-channel incoming optical signal. Each of the channels of the multi-channel incoming optical signal is assumed to have optical content at an optical frequency approximately centered about a respective channel center frequency, such that the optical carrier and sidebands to be measured for dispersion fall within the pass-band of other subsystem components involved in carrier selection and signal processing.

It should be understood that both single optical channel per transmission fiber and multiple optical channels per transmission fiber cases can be considered. The single-channel case is a simplification of the multi-channel one considered here. A remote transmission source 350 generates a plurality of multi-channel optical signals which travel along a plurality of main transmission paths 305. An asymmetric tap can be used to divert a portion of the multi-channel optical signals to an input selector switch 306, which causes the selection of one of the multi-channel optical signals as the multi-channel "incoming" optical signal, which is provided to the dispersion discrimination subsystem 302 along an input optical fiber 304.

The input optical fiber 304 is connected to a demultiplexing splitter unit 308, which can be embodied as a passive optical coupler feeding a pair of demultiplexers or other similar configurations. The demultiplexing splitter unit 308 implements optical functions for transforming the multi-channel incoming optical signal into one or more single-channel optical signals. The demultiplexing splitter unit 308 further includes circuitry for dividing the power of the one or more single-channel optical signals amongst two or more single-channel optical signals organized in two distinct groups, denoted Group 1 and Group 2.

Various specific configurations of the demultiplexing splitter unit 308 are described later on with reference to FIGS. 5–9, specifically showing some of the different methods of applying these somewhat different functions. For example, it will be plain to someone of ordinary skill in the art that the order of execution of demultiplexing and splitting can be reversed. It should also be mentioned that demultiplexing functionality of the demultiplexing splitter unit 308 is not necessary when the optical signal on input optical fiber 304 is already in a single-channel format, in which case the demultiplexing splitter unit 308 could be referred to simply as a splitter unit.

As was the case with the dispersion discrimination subsystem 12 of FIG. 1, the dispersion discrimination subsystem 302 of FIG. 3A, contains two "arms", namely a "positive" arm 322 and a "negative" arm 324. A first receiver unit 318 is connected at the output of the positive arm 322 and a second receiver unit 319 is connected at the output of the negative arm 324. The receiver units 318, 319 include circuitry for performing such operations as optical-to-electrical signal conversion and band-pass filtering of the converted electrical signal. It is also within the scope of the present invention for the receiver units 318, 319 to perform optical band-pass filtering or wavelength-division demultiplexing, the latter task having been described herein above as performed by the demultiplexing splitter unit 308.

In addition, each receiver unit 318, 319 also includes circuitry, software and/or control logic for assessing characteristics of the signal received along the respective arm 322, 324. It is recalled that this signal occupies the channel under test. The signal characteristics may be assessed in any of a number of suitable ways, e.g., by performing a measurement of total power, power spectral density, signal-to-noise ratio (SNR), etc. Each receiver unit 318, 319 outputs its measured signal characteristic to a processing unit 320. The processing unit 320 includes circuitry, software and/or control logic for performing a comparison of the received measurements and to determine the polarity and/or magnitude of the dispersion affecting the particular channel of the incoming optical signal on the basis of this comparison.

The processing unit 320 provides the measured dispersion polarity and/or magnitude to a controller 326, which may be implemented as a microprocessor. The controller 326 can be used to provide a metering or monitoring of dispersion values or it can be connected to a dispersion compensation subsystem (not shown), a suitable example of which is described in above-referenced U.S. patent application Ser. No. 09/965,810 to Graves, entitled "Dispersion Discrimination And Compensation System And Optical Switch For Use Therewith".

In accordance with an embodiment of the present invention, and unlike the dispersion discrimination subsystem 12 of FIG. 1, an adjustable compensation region 310 is interposed between the demultiplexing splitter unit 308 and the positive arm 322, and an adjustable compensation region 312 is interposed between the demultiplexing splitter unit 308 and the negative arm 324. The respective adjustable compensation region 310 and 312 in combination with the respective positive and negative arms 322 and 324 form respective composite dispersion arms 330 and 332. The adjustable compensation regions 310, 312 provide optical carrier frequency range compensation which allows the dispersion discrimination subsystem 302 to achieve balance at any selected one of a plurality of optical frequencies in a broad optical frequency range by building out the dispersion added through the overall composite dispersion arms 330 and 332 to a pre-determined value that equalizes the dispersion magnitude (but not polarity) in the two composite dispersion arms 330, 332 at the particular optical frequency of interest.

In the path to the positive arm 322, the adjustable compensation region 310 includes a set of at least two possible first optical paths that are made available to the optical signals in Group 1, as well as a path selection unit adapted to select one of these paths as the path traveled by the signal sent to the positive arm 322.

Various implementations of the adjustable compensation region 310 will be described herein below. Generally, each first optical path is designed to apply additional dispersion of like polarity (e.g., positive) resulting in a different dispersion magnitude vs. frequency characteristic, thereby moving the optical frequency at which the discriminator balances.

The overall effect is shown in FIG. 3B. A plot of the dispersion magnitude vs. frequency characteristic of the arms of the dispersion discrimination compensation subsystem 12 of FIG. 1 is denoted 340. The same plot is denoted 345 for the dispersion discrimination subsystem 302 of FIG. 3A. Specifically, in the case of the subsystem 12, the characteristic of the positive arm 20 is denoted 250 and the characteristic of the negative arm 22 is denoted 355. In the case of the subsystem 302, the characteristic of the basic positive dispersion arm 330 is denoted 350', while the dispersion characteristic of the basic negative dispersion arm 332 is denoted 355.

Of note is the fact that the subsystem 12 has a single balance frequency 360, and the subsystem 12 is unbalanced in the frequency range 365 immediately adjacent the balance frequency 360. On the other hand, the subsystem 302 can be selectively balanced in any frequency belonging to a balance frequency range 360', by virtue of carefully selecting the positive and negative dispersion characteristics from among those belonging to a range of dispersion characteristics, denoted 370. Balancing is achieved by selectively adding elements of further dispersion, to create the various aggregate dispersion characteristics captured in the range shown by 370.

The selective balancing effect described herein above may be achieved by using different lengths or compositions of optical fiber for each of the first optical paths. For a single-channel optical signal occupying a channel under test, the path selection unit is operated so that a desired amount of additional dispersion has been applied to the signal being sent to the positive arm 322. The center frequency of the channel under test may be provided to the selection unit of the compensation regions 310, 312 at control inputs 316, 317.

Analogously, in the path to the negative arm 324, the adjustable compensation region 312 includes a set of at least two possible second optical paths that are made available to the optical signals in Group 2, as well as a path selection unit adapted to select one of these paths as the path traveled by the signal sent to the negative arm 324. Each second optical path is designed to apply differential dispersion of the opposite polarity but with different dispersion vs. frequency characteristics. Again, this may be achieved by using different lengths or compositions of optical fiber for each of the second optical paths. For a single-channel optical signal occupying a channel under test, the path selection unit is operated so that a desired amount of differential dispersion has been applied to the signal being sent to the negative arm 324.

Thus, depending on the particular first optical path traveled by the optical signal occupying the channel under test, this signal will experience a different amount of compensating positive dispersion, while the optical signal occupying the same channel under test will experience different amounts of compensating negative dispersion, depending on the second optical path it is made to travel. Since the amount of differential dispersion applied to the signals input to the positive and negative arms 322, 324 is individually selectable for each arm, it is now possible to apply precisely the amounts of differential dispersion which will allow the net additional dispersion in the signal exiting the positive and negative arms to be made equal but opposite, at the center frequency of the channel under test.

Selection of the first optical path and selection of the second optical path is performed by the controller 326 on the basis of the center frequency of the channel under test. Hence, the present invention makes it possible to compensate for an imbalance in the arms 322, 324 at the center frequency of the channel under test, leading to more accurate measurements of the polarity and/or magnitude of the dispersion in the multi-channel incoming optical signal in the spectral region surrounding the center frequency of the channel under test.

Figure 2A:
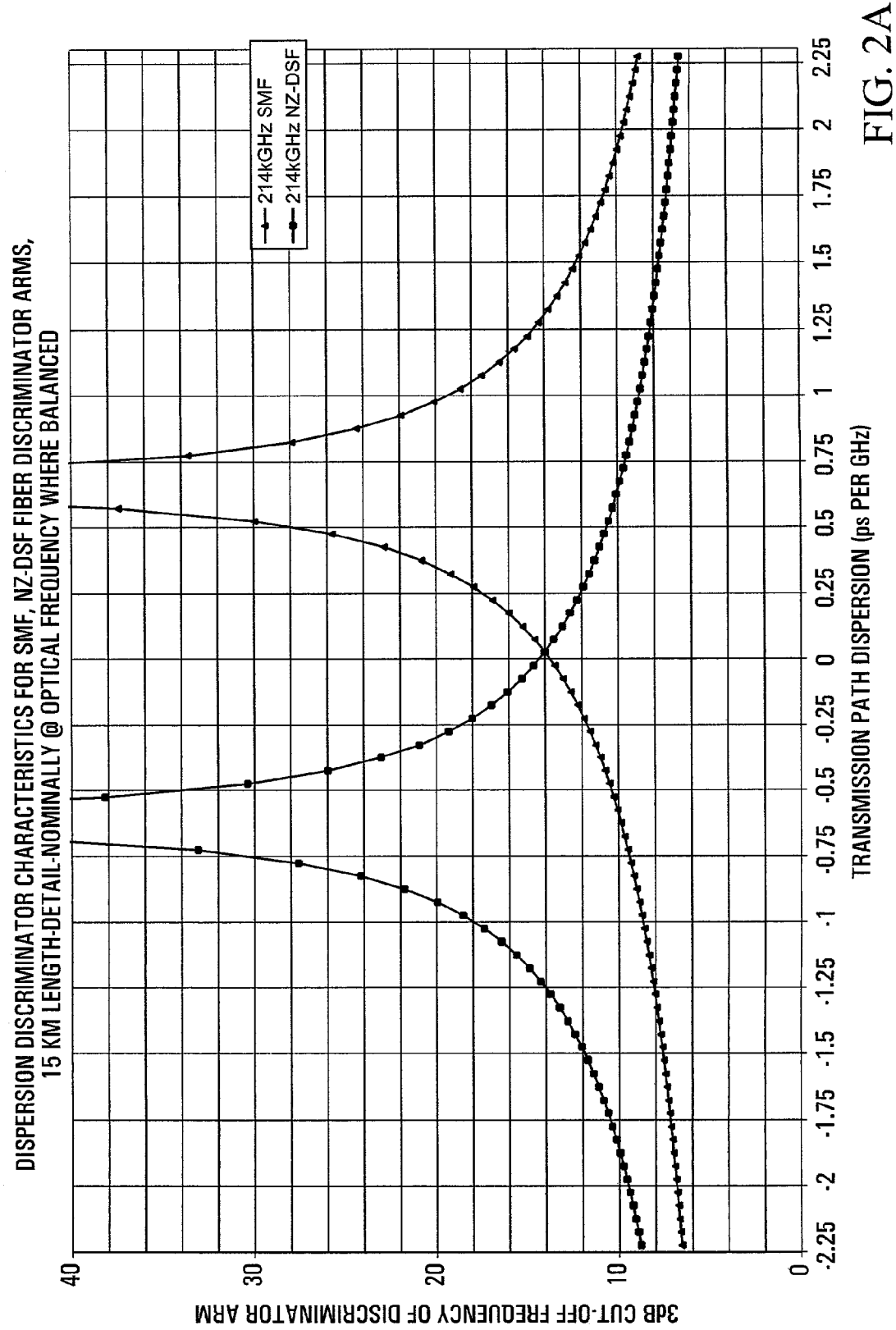
FIG. 2A shows a response characteristic of the dispersion discrimination subsystem of FIG. 1 at an operating optical carrier frequency equal to the nominal operating carrier frequency.
Figure 2B:
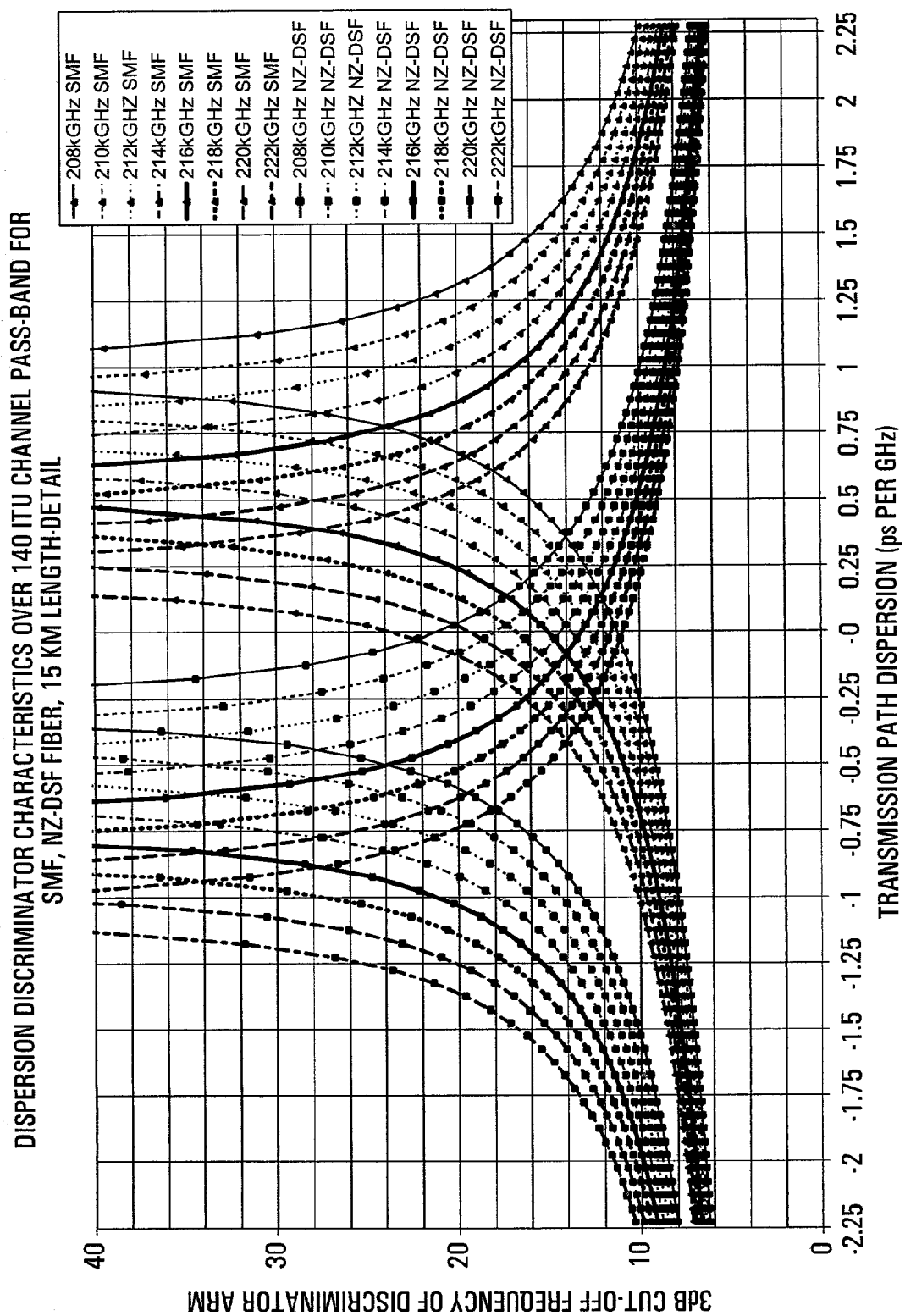
FIG. 2B shows a response characteristic of the dispersion discrimination subsystem of FIG. 1 at various operating optical carrier frequencies away from the nominal operating carrier frequency.

Thus, through appropriate selection of the first and second optical paths in the adjustable compensation regions 310, 312, the response characteristic for the composite dispersion arms 330, 332 will resemble that shown in FIG. 4, which is a plotted output at a wide range of optical frequencies from a model of the dispersion discrimination subsystem 302, for different center frequencies of the channel under test. These responses show that for channel center frequencies in a relatively wide optical frequency band, the performance characteristic for the composite dispersion arms 330, 332 of the dispersion discrimination subsystem 302 matches the behaviour of the dispersion discrimination subsystem 12 of FIG. 1 when it was operating at its nominal operating optical frequency. The results show a balanced operation, with the traces corresponding to a wide range of optical frequencies almost exactly overlaying, which contrasts with the traces obtained for the uncompensated discriminator of FIG. 1, as shown on FIG. 2B.

A notable feature of the response curves in FIG. 4 is that each is a mirror image of itself around a zero dispersion point and that each arm exhibits a "pole" (infinite frequency) at an input dispersion which is equal but opposite to the dispersion applied in that aggregate optical path arm. For a channel under test that has positive input dispersion, then the combination of selected second optical path 312 and negative arm 324 will always show a higher high-frequency content (in terms of primary roll-off) than the combination of selected first optical path 310 and positive arm 322, giving an unambiguous indication of input signal dispersion polarity. For channels under test that have a negative input dispersion, the opposite is true.

Figure 5:
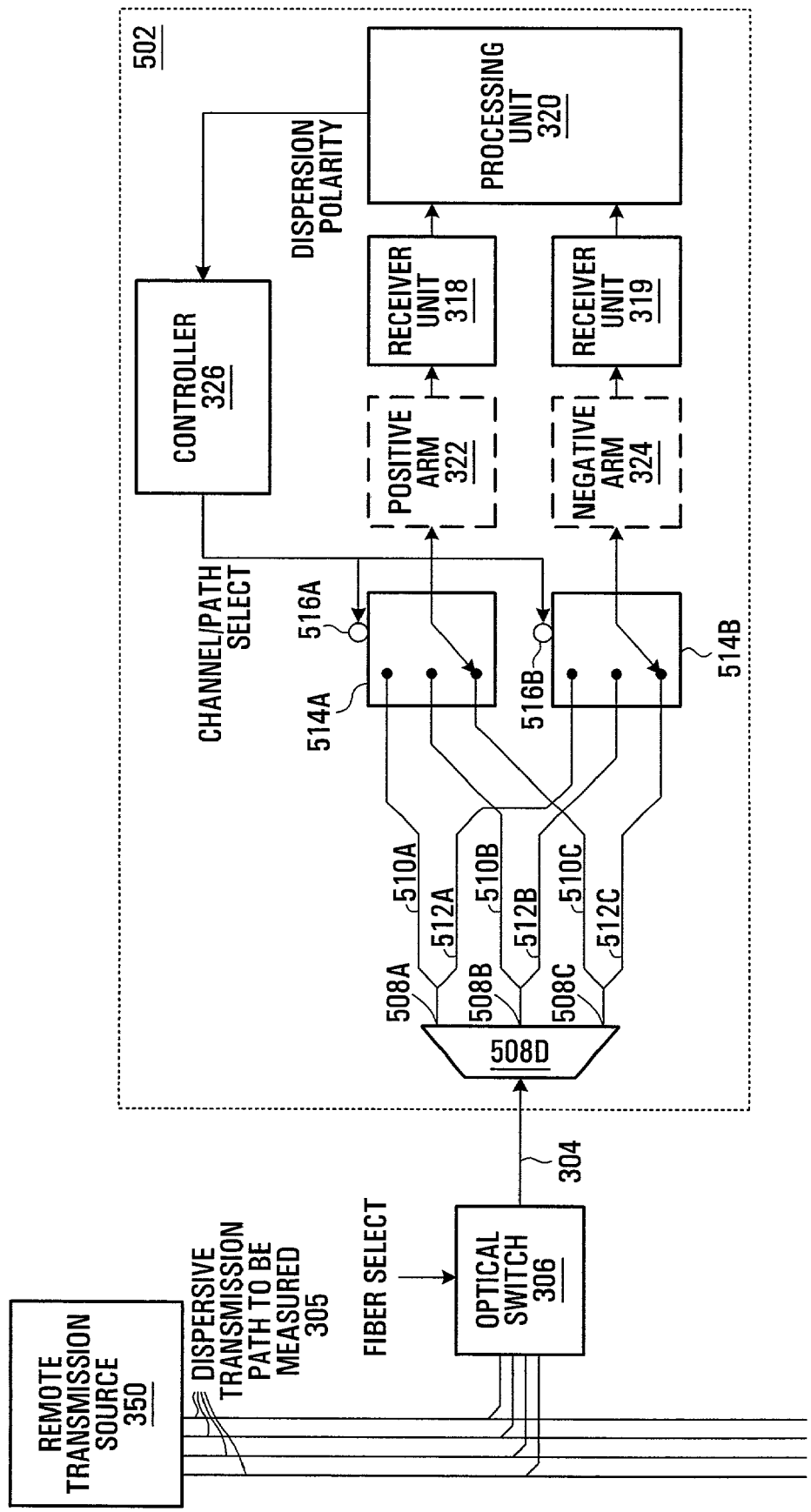
FIG. 5 shows, in block diagram form, a dispersion discrimination subsystem in accordance with a first specific embodiment of the present invention.

Specific embodiments of the demultiplexing splitter 308 and adjustable compensation regions 310, 312 are now described with reference to FIGS. 5 to 9. In FIG. 5, there is shown a dispersion discrimination subsystem 502 in accordance with a specific embodiment of the invention. It is seen that the demultiplexing splitter unit 308 is formed of a wavelength-division demultiplexing (WDD) device 508D and a plurality of two-way splitters 508A, 508B, 508C.

The WDD device 508D has an input port for receiving the multi-channel incoming optical signal. The WDD device 508D also has a plurality of output ports, each output port dedicated to carrying an optical signal within a corresponding band of optical frequencies. In the illustrated embodiment, the WDD device 508D is provided with three output ports. In a representative embodiment, there may be as many output ports of the WDD device 508D as there are channels in the multi-channel incoming optical signal (typically in the range from 16 to 160, though other numbers are possible).

In still other embodiments of the present invention, there may be fewer output ports than channels, with each output port carrying a multi-channel optical signal of its own, but of narrower bandwidth than the multi-channel incoming optical signal on optical fiber 304, in which case the final selection of the optical channel under test will be carried out in the receiver units 318, 319. Under these circumstances, each band of optical carriers will be individually associated, at the band level, with a value of chromatic compensation in the discriminator arms 322, 324 and optical carriers near the edges of these bands will be subject to a small residual error in the null point of the discriminator that is dependent upon the width of these bands. The error depends on the optical frequency range across the individual bands and on the variation of the dispersion as a function of frequency in each arm 322, 324 and in each adjustable compensation region 310, 312. The relationship between residual error and the values of these properties can readily be used by those skilled in the art to compute the value of error for their particular circumstance and to choose an appropriate breadth of banding to control this error to any arbitrary value they may choose. Alternatively, one may choose to use a banding value of one optical carrier per band in which case this source of error is eliminated.

At each of the output ports of the WDD device 508D there is provided a two-way splitter. Thus, in FIG. 5, there are three two-way splitters 508A, 508B and 508C, each connected to a respective one of the output ports of the WDD device 508D. Each two-way splitter divides the power of the optical signal exiting the corresponding output port of the WDD device 508D into two portions, one of which is sent along a corresponding one of the first optical paths in the adjustable compensation region 310 and the other of which is sent along a corresponding one of the second optical paths in the adjustable compensation region 312.

More specifically, splitter 508A separates the signal it receives from the WDD device 508D into a signal sent along an optical path 510A (belonging to the set of first optical paths) and an optical path 512A (belonging to the set of second optical paths). Similarly, splitter 508B separates the signal it receives from the WDD device 508D into a signal sent along an optical path 510B (belonging to the set of first optical paths) and an optical path 512B (belonging to the set of second optical paths). Finally, splitter 508C separates the signal it receives from the WDD device 508D into a signal sent along an optical path 510C (belonging to the set of first optical paths) and an optical path 512C (belonging to the set of second optical paths).

Distinct positive differential dispersion is introduced by each of the three "first optical paths" 510A, 510B, 510C and distinct negative differential dispersion is introduced by each of the three "second optical paths" 512A, 512B, 512C. This can be achieved by varying the length (since chromatic dispersion is proportional to length) and composition, especially the location of the dispersion "null" point in the optical frequency domain for each of the individual optical fibers. Persons skilled in the art will be capable of determining with an adequate degree of precision the length and/or composition of a fiber required to apply a chosen dispersion characteristic of a chosen polarity at a chosen optical frequency.

For instance, FIG. 10 shows suitable aggregate positive and negative fiber lengths in the case of a 32 channel—100 GHz grid metro model where the nominal optical frequency is balanced (for equal fiber lengths) at 214 THz. A SMF is an example of a fiber type that can be used to add positive dispersion to the multi-channel incoming optical signal 304, while NZ-DSF is an example of a fiber type that can be used to add negative dispersion to the multi-channel incoming optical signal 304. It is seen that this would result in fixed arm lengths of approximately 4.38 km, with compensation lengths (i.e., within the adjustable compensation regions) of up to 1.41 km. It is noted that, by the use of special optimized fibers, much shorter arms and a lower range of dispersion arm compensation lengths can be achieved, and the center frequency for the range of optical frequencies can be moved to other bands of interest. NZ-DSF and SMF fibers were used here because their properties are well known. In particular, in an embodiment useful at 1550 nm (C-band) fibers would be chosen to center the discriminator around 185–190 THz.

With continued reference to FIG. 5, the first optical paths 510A, 510B, 510C forming the adjustable compensation region 310 all terminate at a first optical switch 514A. The first optical switch 514A is responsive to receipt of a CHANNEL/PATH SELECT signal at a control input 516A identifying a selected first optical channel and path. In an analogous fashion, within the adjustable compensation region 312, the second optical paths 512A, 512B, 512C terminate at a second optical switch 514B and the second optical switch 514B is responsive to receipt of a CHANNEL/PATH SELECT signal at a control input 516B which identifies a selected second optical path. The optical switches 514A, 514B can be embodied as conventional optical switches or cross-connects.

Since the amount of differential dispersion applied by each of the first and second optical paths is known, it is possible to achieve equal and opposite amounts of net dispersion (counting the effect of the positive and negative arms 322, 324) for an optical signal centered about any given optical frequency within the compensation range of paths 510A–C and paths 512A–C through judicious selection of one of the first optical paths 510A, 510B, 510C and one of the second optical paths 512A, 512B, 512C. Thus, the signal provided by the controller 326 to the control input 516A of the first optical switch 514A and to the control input 516B of the second optical switch 514B is a function of the center frequency of the optical channel for which the processing unit 320 is evaluating the dispersion polarity. In other words, because there is only one first optical path and only one second optical path for each channel in this embodiment, the CHANNEL/PATH SELECT signal is actually a path selection signal, which is dependent on the center frequency of the optical channel in question. The relationship between the center frequency of the optical channel in question and the associated first and second optical paths can be stored in a lookup table, for example.

Figure 6:
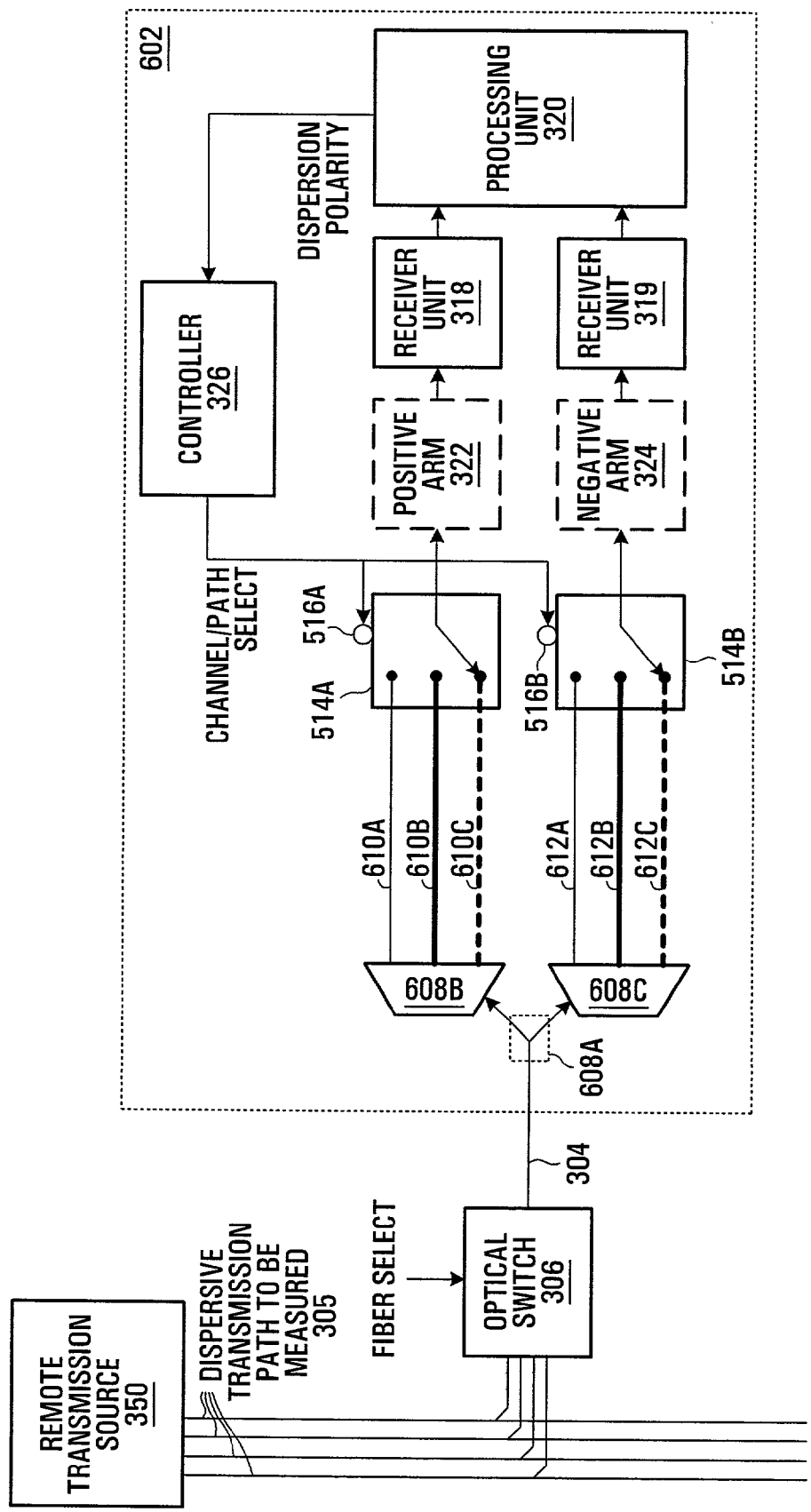
FIG. 6 shows, in block diagram form, a dispersion discrimination subsystem in accordance with a second specific embodiment of the present invention.

With reference to FIG. 6, there is shown a dispersion discrimination subsystem 602 in accordance with another specific embodiment of the invention. It is seen that the demultiplexing splitter unit 308 is formed of a two-way splitter 608A and two wavelength-division demultiplexing (WDD) devices 608B, 608C. The two-way splitter 608A divides the power of the multi-channel incoming optical signal into two portions, one of which enters an input port of WDD device 608B and the other of which enters an input port of WDD device 608C.

Each of the WDD devices 608B, 608C has a plurality of output ports, each output port being dedicated to carrying an optical signal within a corresponding band of optical frequencies. In the illustrated embodiment, WDD devices 608B and 608C are each provided with three output ports. In a representative embodiment, there may be as many output ports of each WDD device 608B, 608C as there are channels in the multi-channel incoming optical signal. In other embodiments of the present invention, there may be fewer output ports than channels, with each output port carrying a multi-channel optical signal of its own, but of narrower bandwidth than the multi-channel incoming optical signal on optical fiber 304.

Each of the output ports of WDD device 608B is connected to a respective one of the plurality of first optical paths 610A, 610B, 610C. Each of the output ports of WDD device 608C is connected to a respective one of the plurality of second optical paths 612A, 612B, 612C. The optical fibers forming the first optical paths 610A, 610B, 610C are designed to apply distinct positive dispersion characteristics to optical signals in the range of interest, while the optical fibers forming the second optical paths 612A, 612B, 612C are designed to apply distinct negative dispersion characteristics to optical signals in the range of interest. This effect can be achieved by varying the length and composition of the individual optical fibers. Persons skilled in the art will be capable of determining with a high degree of precision the length and/or composition of a fiber required to apply a chosen dispersion characteristic of a chosen polarity at a chosen optical frequency.

The first optical paths 610A, 610B, 610C terminate at a first optical switch 514A, while the second optical paths 612A, 612B, 612C terminate at a second optical switch 514B. The first and second optical switches 514A, 514B are as previously described. That is, the first optical switch 514A is responsive to receipt of a CHANNEL/PATH SELECT signal at a control input 516A identifying a selected first optical channel and path. In an analogous fashion, the second optical switch 514B is responsive to receipt of a CHANNEL/PATH SELECT signal at a control input 516B identifying a selected second optical path. The optical switches 514A, 514B can be embodied as conventional optical switches or cross-connects.

Since the amount of differential dispersion applied by each of the first and second optical paths is known, it is possible to achieve equal and opposite amounts of net dispersion in both arms for an optical signal centered about a given optical frequency through judicious selection of one of the first optical paths 610A, 610B, 610C and one of the second optical paths 612A, 612B, 612C. Thus, the signal provided by the controller 326 to the control input 516A of the first optical switch 514A and to the control input 516B of the second optical switch 514B is a function of the center frequency of the optical channel for which the processing unit 320 is evaluating the dispersion polarity. In other words, because there is only one first optical path and only one second optical path for each channel in this embodiment, the CHANNEL/PATH SELECT signal is actually a path selection signal, which is dependent on the center frequency of the optical channel in question. The relationship between the center frequency of the optical channel in question and the associated first and second optical paths can be stored in a lookup table.

Figure 7:
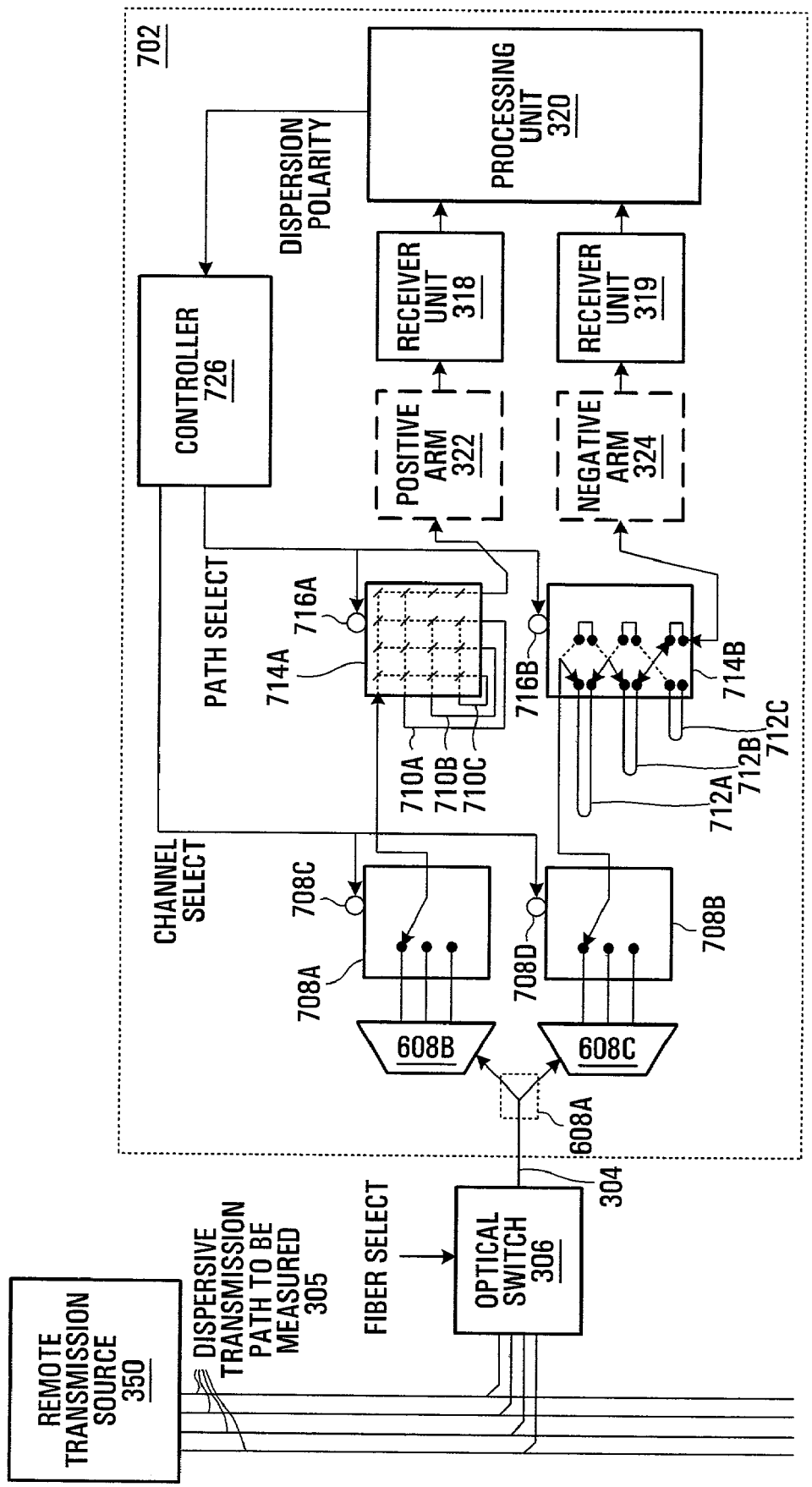
FIG. 7 shows, in block diagram form, a dispersion discrimination subsystem in accordance with a third specific embodiment of the present invention.

With reference to FIG. 7, there is shown a dispersion discrimination subsystem 702 in accordance with yet another specific embodiment of the invention. It is seen that the splitter unit 308 of FIG. 3A is formed of the same two-way splitter 608A and wavelength-division demultiplexing (WDD) devices 608B, 608C as in the embodiment of FIG. 6. In addition, the splitter unit includes a pair of optical switches 708A, 708B.

The two-way splitter 608A divides the power of the multi-channel incoming optical signal into two portions, one of which enters an input port of WDD device 608B and the other of which enters an input port of WDD device 608C. Each of the WDD devices 608B, 608C has a plurality of output ports, each output port being dedicated to carrying an optical signal within a corresponding band of optical frequencies. In the illustrated embodiment, WDD devices 608B and 608C are each provided with three output ports. In a representative embodiment, there may be as many output ports of each WDD device 608B, 608C as there are channels in the multi-channel incoming optical signal. In other embodiments of the present invention, there may be fewer output ports than channels, with each output port carrying a multi-channel optical signal of its own, but of narrower bandwidth than the multi-channel incoming optical signal on optical fiber 304 in which case final demultiplexing to individual optical carriers would be carried out in the receiver units 318, 319.

Each of the output ports of WDD device 608B is connected to a respective input port of optical switch 708A. Optical switch 708A also has an output port and a control port 708C, the latter being adapted to receive a CHANNEL SELECT signal from a controller 726 (which is a modified version of the controller 326). In response to the CHANNEL SELECT signal, optical switch 708A forwards to its output port the single-channel optical signal present at a selected one of its input ports. The output port of optical switch 708A is connected to one of a plurality of input ports of an optical switch 714A.

Similarly, each of the output ports of WDD device 608C is connected to a respective input port of optical switch 708B. Optical switch 708B also has an output port and a control port 708D, the latter being adapted to receive a CHANNEL SELECT signal from the controller 726. In response to the CHANNEL SELECT signal, optical switch 708B forwards to its output port the single-channel optical signal present at a selected one of its input ports. The output port of optical switch 708B is connected to one of a plurality of input ports of an optical switch 714B.

The optical switches 714A, 714B may be identical in structure, or they may be different. Thus, although in FIGS. 7–9, the two optical switches 714A, 714B are shown as being different, it should be appreciated that identical switches could be used.

Considering the implementation shown in FIG. 7, optical switch 714A is seen to have a control port 716A, which is adapted to receive a PATH SELECT signal from the controller 726. Optical switch 714A also has an output port which is connected to an input port of the receiver unit 318. Of note is the fact that optical switch 714A has several additional input ports and several other output ports. A plurality of optical fiber segments 710A, 710B, 710C are connected to these additional input and output ports, with each such optical fiber segment being connected terminated at both ends by one of these additional input ports and one of these additional output ports.

Through control of the path select signal, optical switch 714A can be configured so as to provide a multiplicity of possible mappings between its input ports and its output ports. Therefore, it is possible to cause the signal arriving from optical switch 708A to pass through zero, one or more of the optical fiber segments before emerging at an output port of optical switch 714A.

A possible internal structure for optical switch 714A is shown on FIG. 7 wherein a plurality of movable mirrors are arranged in a matrix structure. This structure may be referred to as a micro-electro-mechanical system (MEMS). By positioning of each mirror so that it either deflects or does not deflect light by 90 degrees, it becomes possible to select which optical fiber segment(s) will be traversed by the signal arriving from optical switch 708A before emerging at the output port of optical switch 714A. In this way, the optical signal is effectively "recirculated" into and out of the optical switch 714A.

Moreover, each of the optical fiber segments 710A, 710B, 710C is designed to apply a distinct positive dispersion characteristic to optical signals in the range of interest. This effect can be achieved by varying the length and composition of the individual optical fiber segments. Thus, concatenation of the optical fiber segments 710A, 710B, 710C in a particular combination allows flexibility in terms of the amount of positive dispersion to be applied at the center frequency of the channel under test. In particular, if the dispersion compensation provided by the three fiber segments 710A, 710B, 710C and 712A, 712B, 712C individually differ in dispersion by powers of two then, by the use of these elements in series, $2^3=8$ different compensations can be built up.

More generally, through the use of N different compensation elements, each differing by powers of two, up to $2^N$ different compensation values can be achieved. For instance, a 32 channel DWDM system with accurate compensation per lambda can be achieved by the use of 5 ($=\log_2 32$) compensating elements and a 6-by-6 photonic switch (or by the use of five 2-by-2 photonic switches). Alternatively, an 8-by-8 photonic switch (or seven 2-by-2 photonic switches), associated with seven compensation elements can compensate 128 wavelengths.

It is further noted that by making one of the fiber compensation elements in each switched compensator large, the discriminator can be re-centered to another operating band (e.g. shifting the center frequency of operation from the C-band (1529–1562 nm) to S-band (around 1480 nm). In the context of an 8-by-8 switch (or seven 2-by-2 switches), this would give six compensation elements within each band (by re-use of the same elements) and a seventh element to shift the discriminator between the bands, thereby creating a 64 channel per band capability with seven compensation fiber lengths and a single 8-by-8 switch (or seven two-by-two switches) for each arm of the discriminator. The relationship between channel center frequencies and the mapping to be applied by optical switch 714A can be stored in a lookup table.

Regarding optical switch 714B, this component could be implemented using the same structure as that of optical switch 714A, i.e., it could be a MEMS-based optical switch. In other embodiments of the present invention, the two optical switches 714A, 714B could be different and neither need be a MEMS-based switch.

In the illustrated embodiment, optical switch 714B is shown as having a plurality of input ports, one of which is connected to the output port of optical switch 708B. Optical switch 714B has a control port 716B, which is adapted to receive a PATH SELECT signal from the controller 726. Optical switch 714B also has an output port which is connected to an input port of the receiver unit 319. Of note is the fact that optical switch 714B has several additional input ports and several other output ports. A plurality of optical fiber segments 712A, 712B, 712C are connected to these additional input and output ports, with each such optical fiber segment being connected terminated at both ends by one of these additional input ports and one of these additional output ports.

Through control of the path select signal, optical switch 714B can be configured so as to provide a multiplicity of possible mappings between its input ports and its output ports. Therefore, it is possible to cause the signal arriving from optical switch 708B to pass through zero, one or more of the optical fiber segments before emerging at an output port of optical switch 714B.

A possible internal structure for optical switch 714B is shown on FIG. 7 wherein a plurality of two-input two-output ("2-by-2") switches are arranged such as to allow selection of the identity of the optical fiber segments through which the signal arriving from optical switch 708B will pass before emerging at the output port of optical switch 714B.

Moreover, each of the optical fiber segments 712A, 712B, 712C is designed to apply a distinct negative dispersion characteristic to optical signals in the range of interest. This effect can be achieved by varying the length and composition of the individual optical fiber segments. Thus, concatenation of the optical fiber segments 712A, 712B, 712C in a particular combination allows flexibility in terms of the amount of negative dispersion to be applied at the center frequency of the chosen channel. The relationship between channel center frequencies and the mapping to be applied by optical switch 714B can be stored in a lookup table. Optical switch 714B can be implemented similarly to optical switch 714A.

Again, it is recalled that the optical switches 714A, 714B can be different or they can have an identical structure.

Figure 8:
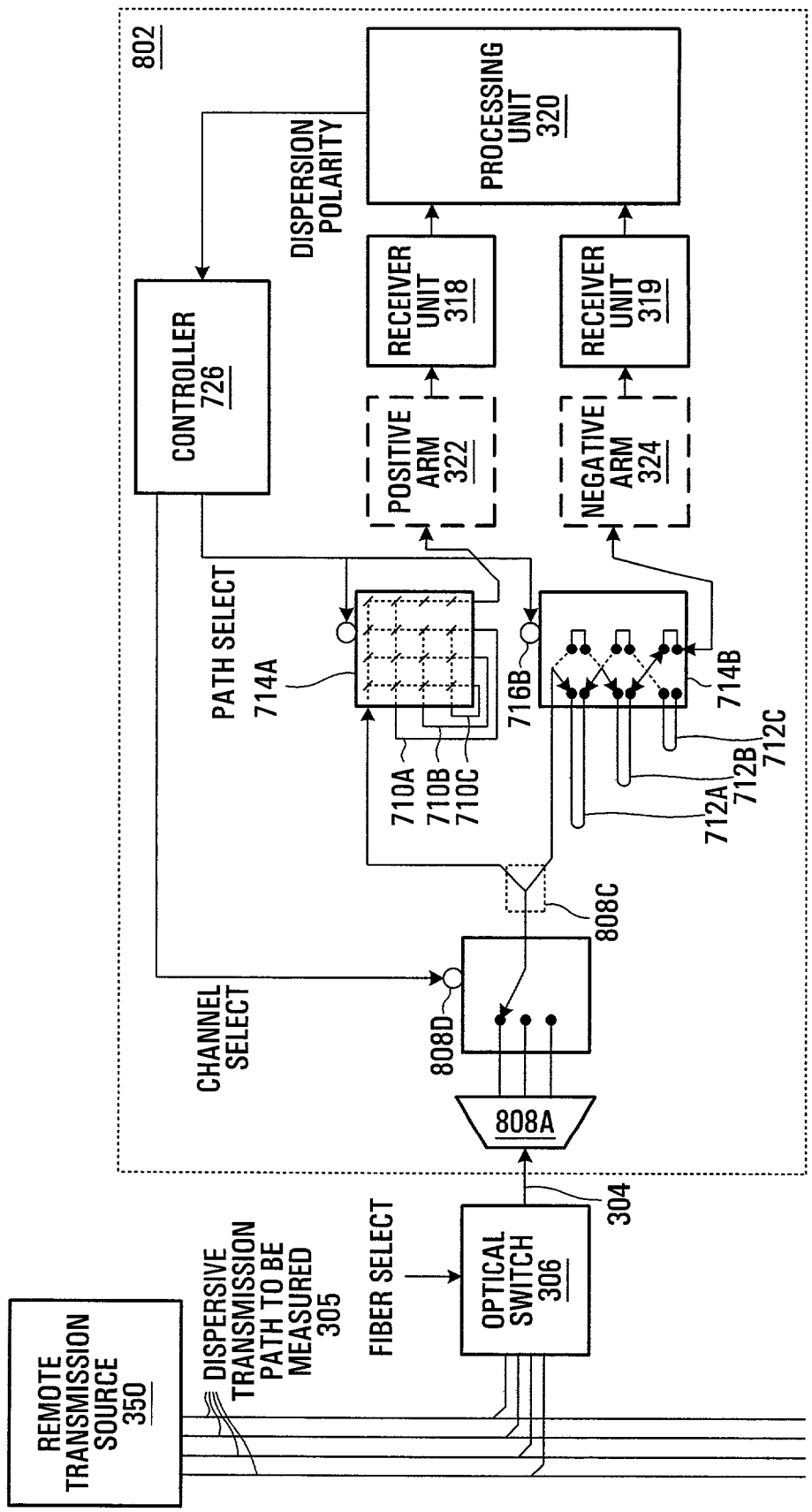
FIG. 8 shows, in block diagram form, a dispersion discrimination subsystem in accordance with a fourth specific embodiment of the present invention.

FIG. 8 shows a dispersion discrimination subsystem 802 in accordance with still another specific embodiment of the invention. The system 802 is similar to the system 720 of FIG. 7, except for changes in the splitter unit. Specifically, the multi-channel incoming optical signal enters an input port of a wavelength-division demultiplexing (WDD) device 808A. The WDD device 808A has a plurality of output ports, each of which is adapted to transport a subset of the wavelengths contained in the multi-channel incoming optical signal. The output ports of the WDD device 808A are connected to respective input ports of an optical switch 808B, which is adapted to receive, via a control port 808D, a CHANNEL SELECT signal received from the controller 726.

In response to the CHANNEL SELECT signal, the optical switch 808B forwards, to an output port, the single-channel optical signal at a selected one of its input ports. The output port of the optical switch 808B is connected to an input port of a two-way splitter 808C, divides the power of the signal received from the optical switch 808B into two portions, one of which is fed to optical switch 714A and the other of which is fed to optical switch 714B. The remainder of the system 802 is as described previously with respect to the system 702 of FIG. 7.

Figure 9:
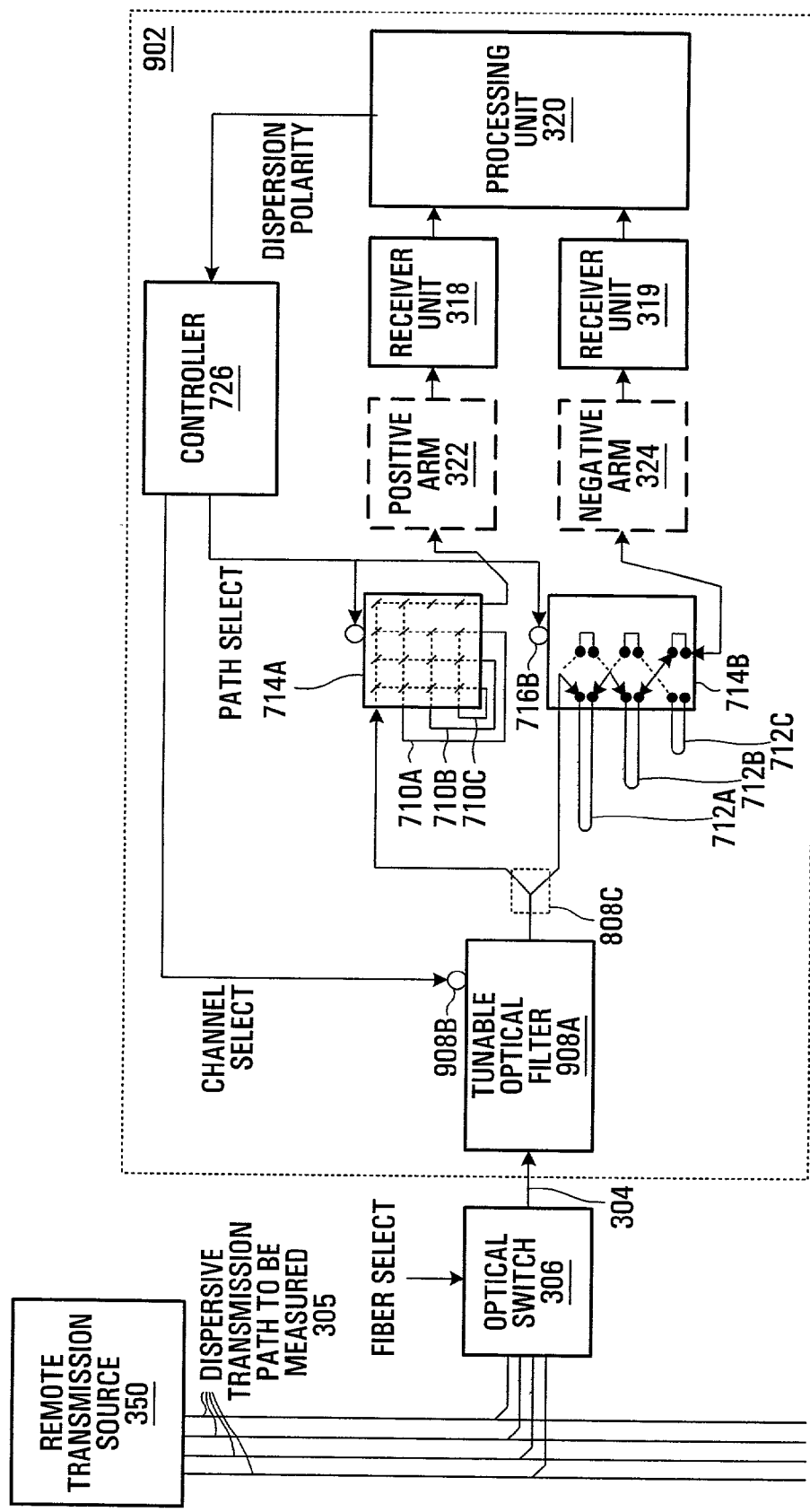
FIG. 9 shows, in block diagram form, a dispersion discrimination subsystem in accordance with a fifth specific embodiment of the present invention.

FIG. 9 shows a dispersion discrimination subsystem 902 in accordance with a further specific embodiment of the invention. The system 902 is virtually identical to the system 802 of FIG. 8, except that a tunable optical filter 908A. The tunable optical filter is responsive to a CHANNEL SELECT signal received at a control port from the controller 726. The tunable optical filter 908A combines the functions of a WDD device and an optical switch, in that it outputs a selected narrowband portion of the multi-wavelength incoming optical signal. The tunable filter performs the same function as the WDD device 808A and optical switch 808 B in FIG. 8.

The choice of whether to pursue the WDD device/optical switch combination or the tunable filter approach is up to the designer. One consideration may be the avoidance of excessive group delay, which may perturb the discrimination process. The effect of excessive group delay is to add arbitrary amounts of additional phase shift to high frequency sidebands of the optical carrier and. Since the dispersion discriminator systems 302, 502, 602, 702, 802, 902 operate by comparing effects on the phase of the sidebands, excessive group delay can introduce errors.

With current technology, components can be found with adequately low group delay. For example, the WDD device/optical switch combination does not introduce significant levels of group delay, especially if the WDD devices are fabricated around Array Waveguide Technology. In addition, some tunable filters also exhibit a low group delay.

The remainder of the system 902 is as described previously with respect to the system 802 of FIG. 8.

In each of the engineering solutions described herein above, the objective is the same, namely to apply differential compensation to the two discriminator arms to move the discriminator "balance" point to lie at the optical frequency of the carrier to be measured. All of these approaches exploit the fact that it is equal but opposite dispersion in the arms that is important, and not necessarily equal arm length. Of course, still other configurations are possible, which provide flexibility in selecting the compensation paths traveled by the signals sent into the positive and negative arms 322, 324, respectively.

Those skilled in the art should appreciate that in some embodiments of the invention, all or part of the functionality previously described herein with respect to the processing unit 320 may be implemented as pre-programmed hardware or firmware elements (e.g., application specific integrated circuits (ASICs), electrically erasable programmable read-only memories (EEPROMs), etc.), or other related components.

In other embodiments of the invention, all or part of the functionality previously described herein with respect to the processing unit 320 may be implemented as software consisting of a series of program instructions for execution by a digital computer, including a processing unit and a memory connected by a communication bus. Such memory includes data and the program instructions. The processing unit is adapted to process the data and the program instructions in order to implement the functional blocks described in the specification and for which the operation is depicted in the drawings.

The program instructions could be stored on a medium which is fixed, tangible and readable directly by the computer system, (e.g., removable diskette, CD-ROM, ROM, or fixed disk), or the program instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the program instructions may be written in a number of programming languages for use with many computer architectures or operating systems. For example, some embodiments may be implemented in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

We claim:

1. A system for detecting dispersion in an incoming optical signal containing optical frequencies centered about a channel center frequency, the system comprising:
   a splitter unit for separating the incoming optical signal into a first group of at least one optical signal and a second group of at least one optical signal;
   a first compensation region connected to the splitter unit, the first compensation region being adapted to apply a desired one of a plurality of positive dispersion characteristics to an optical signal in the first group;
   a second compensation region connected to the splitter unit, the second compensation region being adapted to apply a desired one of a plurality of negative dispersion characteristics to an optical signal in the second group; and
   a receiver unit connected to the first and second compensation regions, said receiver unit being adapted to perform a comparison of characteristics of signals received from the first and second compensation regions and to detect the dispersion in the incoming optical signal on the basis of said comparison.

2. The system defined in claim 1, wherein said splitter unit includes:
   a wavelength division demultiplexer (WDD) having an input and a plurality of outputs, the input of the WDD being adapted to receive the incoming optical signal, the WDD being configured to separate the incoming optical signal among the outputs of the WDD on the basis of wavelength; and
   a plurality of splitters, each splitter having an input and a plurality of outputs, the input of each splitter being connected to a respective one of the outputs of the WDD, each splitter being configured to divide the power of the signal at its input among its outputs;
   wherein the first and second groups of at least one optical signal each include at least one signal from each of the plurality of splitters.

3. The system defined in claim 1, wherein said splitter unit includes:
   a splitter having an input and a plurality of outputs, the input of the splitter being adapted to receive the incoming optical signal; and
   a plurality of wavelength division demultiplexers (WDDs), each WDD having an input and a plurality of outputs, the input of each WDD being connected to a respective one of the outputs of the splitter;
   wherein the first and second groups of at least one optical signal each include at least one signal from each of the plurality of WDDs.

4. The system defined in claim 1, wherein said splitter unit includes:
   a wavelength division demultiplexer (WDD) having an input and a plurality of outputs, the input of the WDD being adapted to receive the incoming optical signal, the WDD being configured to separate the incoming optical signal among the outputs of the WDD on the basis of wavelength;
   an optical switch having an output and a plurality of inputs, the inputs of the optical switch being connected to the outputs of the WDD, the optical switch being adapted to select a signal at one of its inputs and providing the selected signal to its output; and
   a splitter having an input and a plurality of outputs, the input of the splitter being connected to the output of the optical switch, the splitter being configured to divide the power of the signal at its input among its outputs;
   wherein the first group of at least one optical signal includes the signal at a first one of the outputs of the splitter and wherein the second group of at least one optical signal includes the signal at a second one of the outputs of the splitter.

5. The system defined in claim 1, wherein said splitter unit includes:
   a tunable optical filter having an input and an output, the input of the tunable optical filter being adapted to receive the incoming optical signal, the tunable optical filter being configured to provide at its output a portion of the incoming optical signal occupying a selected optical frequency range; and
   a splitter having an input and a plurality of outputs, the input of the splitter being connected to the output of the tunable optical filter, the splitter being configured to divide the power of the signal at its input among its outputs;
   wherein the first group of at least one optical signal includes the signal at a first one of the outputs of the splitter and wherein the second group of at least one optical signal includes the signal at a second one of the outputs of the splitter.

6. The system defined in claim 2,
   wherein the first compensation region includes:
      plurality of first optical paths, each first optical path applying a distinct positive dispersion characteristic to a corresponding signal in the first group; and
      a first optical switch, for selecting a signal in the first group to which the desired positive dispersion characteristic has been applied and preventing any other signal in the first group from reaching the receiver unit;
   wherein the second compensation region includes:
      a plurality of second optical paths, each second optical path applying a distinct positive negative characteristic to a corresponding signal in the second group; and
      a second optical switch, for selecting a signal in the second group to which the desired negative dispersion characteristic has been applied and preventing any other signal in the second group from reaching the receiver unit.

7. The system defined in claim 6, wherein said first and second optical paths apply distinct positive and negative dispersion characteristics by virtue of having different lengths.

8. The system defined in claim 6, wherein said first and second optical paths apply distinct positive and negative dispersion characteristics by virtue of having different material compositions.

9. The system defined in claim 3, wherein the first compensation region includes:
   a plurality of first optical paths, each first optical path applying a distinct positive dispersion characteristic to a corresponding signal in the first group;
   a first optical switch, for selecting a signal in the first group to which the desired positive dispersion characteristic has been applied and preventing any other signal in the first group from reaching the receiver unit;
   a plurality of second optical paths, each second optical path applying a distinct positive negative characteristic to a corresponding signal in the second group; and
   a second optical switch, for selecting a signal in the second group to which the desired negative dispersion characteristic has been applied and preventing any other signal in the second group from reaching the receiver unit.

10. The system defined in claim 3, wherein the first compensation region includes:
a first optical switching unit having a plurality of inputs and a plurality of outputs;
each signal in the first group being received at a corresponding one of the inputs of the first optical switching unit;
a first output of the first optical switching unit being connected to the receiver unit;
at least two other ones of the outputs of the first optical switching unit being connected to corresponding other ones of the inputs of the first optical switching unit via corresponding ones of a plurality of first optical paths, each first optical path being associated with a distinct positive dispersion characteristic;
the first optical switching unit being adapted to admit a selected one of the signals in the first group through a selected series combination of at least one of the first optical paths so as to emerge at said first output of the first optical switching unit.

11. The system defined in claim 10, wherein the first optical paths include a sufficient number and configuration of first optical paths to allow the overall dispersion characteristic of the selected series combination of at least one of the first optical paths to span at least two optical transmission bands.

12. The system defined in claim 11, wherein the second compensation region includes:
a second optical switching unit having a plurality of inputs and a plurality of outputs;
each signal in the second group being received at a corresponding one of the inputs of the second optical switching unit;
a first output of the second optical switching unit being connected to the receiver unit;
at least two other ones of the outputs of the second optical switching unit being connected to corresponding other ones of the inputs of the second optical switching unit via corresponding ones of a plurality of second optical paths, each second optical path being associated with a distinct positive dispersion characteristic;
the second optical switching unit being adapted to admit a selected one of the signals in the second group through a selected series combination of at least one of the second optical paths so as to emerge at said first output of the second optical switching unit.

13. The system defined in claim 12, wherein the first optical paths include a sufficient number and configuration of first optical paths to allow the overall dispersion characteristic of the selected series combination of at least one of the first optical paths to span at least two optical transmission bands.

14. The system defined in claim 4, wherein the first compensation region includes:
a first optical switching unit having a plurality of inputs and a plurality of outputs;
a first input of the first optical switching unit being adapted to receive the signal at said first one of the outputs of the splitter;
a first output of the first optical switching unit being connected to the receiver unit;
at least two other ones of the outputs of the first optical switching unit being connected to corresponding other ones of the inputs of the first optical switching unit via corresponding ones of a plurality of first optical paths, each first optical path being associated with a distinct positive dispersion characteristic;
the first optical switching unit being adapted to admit a selected one of the signals in the first group through a selected series combination of at least one of the first optical paths so as to emerge at said first output of the first optical switching unit.

15. The system defined in claim 14, wherein the second compensation region includes:
a second optical switching unit having a plurality of inputs and a plurality of outputs;
a first input of the second optical switching unit being adapted to receive the signal at said second one of the outputs of the splitter;
a first output of the second optical switching unit being connected to the receiver unit;
at least two other ones of the outputs of the second optical switching unit being connected to corresponding other ones of the inputs of the second optical switching unit via corresponding ones of a plurality of second optical paths, each second optical path being associated with a distinct positive dispersion characteristic;
the second optical switching unit being adapted to admit a selected one of the signals in the second group through a selected series combination of at least one of the second optical paths so as to emerge at said first output of the second optical switching unit.

16. The system defined in claim 5, wherein the first compensation region includes:
a first optical switching unit having a plurality of inputs and a plurality of outputs;
a first input of the first optical switching unit being adapted to receive the signal at said first one of the outputs of the splitter;
a first output of the first optical switching unit being connected to the receiver unit;
least two other ones of the outputs of the first optical switching unit being connected to corresponding other ones of the inputs of the first optical switching unit via corresponding ones of a plurality of first optical paths, each first optical path being associated with a distinct positive dispersion characteristic;
the first optical switching unit being adapted to admit a selected one of the signals in the first group through a selected series combination of at least one of the first optical paths so as to emerge at said first output of the first optical switching unit.

17. The system defined in claim 16, wherein the second compensation region includes:
a second optical switching unit having a plurality of inputs and a plurality of outputs;
a first input of the second optical switching unit being adapted to receive the signal at said second one of the outputs of the splitter;
a first output of the second optical switching unit being connected to the receiver unit;
at least two other ones of the outputs of the second optical switching unit being connected to corresponding other ones of the inputs of the second optical switching unit via corresponding ones of a plurality of second optical paths, each second optical path being associated with a distinct positive dispersion characteristic;

the second optical switching unit being adapted to admit a selected one of the signals in the second group through a selected series combination of at least one of the second optical paths so as to emerge at said first output of the second optical switching unit.

18. The system defined in claim 1, wherein the receiver unit includes:

a first receiver unit connected to the first compensation region and adapted to measure the characteristic of the signal received from the first compensation region;

a second receiver unit connected to the second compensation region and adapted to measure the characteristic of the signal received from the second compensation region;

a processing unit adapted to perform a comparison of the measured characteristics and to detect the dispersion in the incoming optical signal on the basis of said comparison.

19. The system defined claim 18, wherein the characteristic measured by the first and second receiver units is a power level.

20. The system defined claim 18, wherein the characteristic measured by the first and second receiver units is a roll-off frequency.

21. The system defined in claim 18, wherein for the case where the characteristic of one of the received signals is found to be degraded with respect to the characteristic of the other one of the received signals, the processing unit is adapted to determine that the polarity of the dispersion in the incoming optical signal is the opposite of the polarity of the dispersion characteristic applied to the received signal found to have the non-degraded characteristic.

22. The system defined in claim 18, wherein for the case where the characteristic of one of the received signals is found to be degraded with respect to the characteristic of the other one of the received signals, the processing unit is adapted to determine that the polarity of the dispersion in the incoming optical signal is the same as the polarity of the dispersion characteristic applied to the received signal found to have the degraded characteristic.

23. The system defined in claim 1, further comprising a control unit adapted to select the desired positive and negative dispersion characteristics as a function of the channel center frequency.

24. The system defined in claim 23, the control unit being further adapted to determine the channel center frequency of the incoming optical signal.

25. The system defined in claim 4, further comprising a control unit adapted to select the desired positive and negative dispersion characteristics as a function of the channel center frequency, the control unit being further adapted to control the optical switch to select a signal at one of its inputs.

26. The system defined in claim 4, further comprising a control unit adapted to select the desired positive and negative dispersion characteristics as a function of the channel center frequency, the control unit being further adapted to control the selected optical frequency range passed by said tunable optical filter.

27. The system defined in claim 6, further comprising a control unit adapted to control operation of the first and second optical switches as a function of the channel center frequency.

28. The system defined in claim 9, further comprising a control unit adapted to control operation of the first and second optical switches as a function of the channel center frequency.

29. The system defined in claim 13, further comprising a control unit adapted to control operation of the first and second optical switching units as a function of the channel center frequency.

30. The system as defined in claim 15, further comprising a control unit adapted to control operation of the first and second optical switching units as a function of the channel center frequency.

31. The system defined in claim 17, further comprising a control unit adapted to control operation of the first and second optical switching units as a function of the channel center frequency.

32. The system defined in claim 1, wherein the dispersion is chromatic dispersion.

33. The system defined in claim 1, wherein the dispersion is polarization mode dispersion.

34. The system defined in claim 1, further comprising a fiber selector for receiving a plurality of multi-wavelength optical signals and enabling the selection of one of the multi-wavelength optical signals as the incoming optical signal.

35. The system defined in claim 1, wherein each of the first and second first compensation regions includes a fixed dispersion region and a variable dispersion region.

36. The system defined in claim 10, wherein the first optical switching unit includes an array of mirrors, each said mirror being optically associated with a respective one of the other inputs and a respective one of the other outputs, each mirror being selectably positionable in either a deflecting position or a non-deflecting position, wherein positioning of a selected subset of said mirrors in a deflecting position allows the selected one of the signals in the first group to pass through the selected series combination of first optical paths and to emerge at said first output of the first optical switching unit.

37. A method of detecting dispersion in an incoming optical signal containing optical frequencies centered about a channel center frequency, the method comprising:

selecting a positive dispersion characteristic and a negative dispersion characteristic on the basis of the channel center frequency of the incoming optical signal;

applying the selected positive dispersion characteristic to a first portion of the incoming optical signal;

applying the selected negative dispersion characteristic to a second portion of the incoming optical signal; and processing the first and second portions of the optical signal to determine the dispersion in the incoming optical signal.

38. The method of claim 37, further comprising:

determining a center optical frequency of the incoming optical signal.

39. The method of claim 37, further comprising:

changing the center optical frequency; and changing the selected positive and negative dispersion characteristics according to the changed center optical frequency.

40. The method of claim 37, further comprising:

processing the first and second portions of the incoming optical signal to determine a polarity of the dispersion in the incoming optical signal.

41. The method of claim 37, further comprising:
  processing the first and second portions of the incoming optical signal to determine a magnitude of the dispersion in the incoming optical signal.

42. A system for detecting dispersion in an incoming optical signal containing optical frequencies centered about a channel center frequency, the system comprising:
  means for selecting a positive dispersion characteristic and a negative dispersion characteristic on the basis of the center optical frequency of the incoming optical frequency;
  means for applying the selected positive dispersion characteristic to a first portion of the incoming optical signal;
  means for applying the selected negative dispersion characteristic to a second portion of the incoming optical signal; and
  means for processing the first and second portions of the optical signal to determine the dispersion in the incoming optical signal.

43. A system for detecting dispersion in an incoming optical signal containing optical frequencies centered about a channel center frequency, the system comprising:
  splitting means for separating the incoming optical signal into a first group of at least one optical signal and a second group of at least one optical signal;
  first compensation means connected to the splitter means, the first compensation means being adapted to apply a desired one of a plurality of positive dispersion characteristics to an optical signal in the first group;
  second compensation means connected to the splitter means, the second compensation means being adapted to apply a desired one of a plurality of negative dispersion characteristics to an optical signal in the second group; and
  receiver means connected to the first and second compensation means, said receiver means being adapted to perform a comparison of characteristics of signals received from the first and second compensation means and to detect the dispersion in the incoming optical signal on the basis of said comparison.

* * * * *